US008597096B2

(12) United States Patent
Naicker

(10) Patent No.: US 8,597,096 B2
(45) Date of Patent: Dec. 3, 2013

(54) METHODS AND DEVICES FOR CARD GAMES WITH CARD REPLACEMENT

(75) Inventor: Theo Naicker, Durban (ZA)

(73) Assignee: Cork Group Trading Ltd., Tortola (VG)

( * ) Notice: Subject to any disclaimer, the term of this patent is extended or adjusted under 35 U.S.C. 154(b) by 451 days.

(21) Appl. No.: 12/703,960

(22) Filed: Feb. 11, 2010

(65) Prior Publication Data

US 2011/0092263 A1 Apr. 21, 2011

Related U.S. Application Data

(63) Continuation-in-part of application No. 12/580,607, filed on Oct. 16, 2009, now Pat. No. 8,303,390, and a continuation-in-part of application No. 12/580,615, filed on Oct. 16, 2009, now Pat. No. 8,308,538.

(51) Int. Cl.
*A63F 13/12* (2006.01)
*A63F 1/00* (2006.01)

(52) U.S. Cl.
USPC .................................. 463/13; 463/25; 463/42

(58) Field of Classification Search
USPC ................................. 463/13, 25, 42; 273/292
See application file for complete search history.

(56) References Cited

U.S. PATENT DOCUMENTS 4,743,022 A * 5/1988 Wood .............................. 463/13
4,760,527 A * 7/1988 Sidley ............................. 463/13
5,042,818 A * 8/1991 Weingardt ...................... 463/13
5,704,835 A 1/1998 Dietz, II
6,416,407 B1 7/2002 Carrico et al.
7,393,278 B2 7/2008 Gerson et al.
8,308,538 B2 * 11/2012 Naicker .......................... 463/11
2005/0026665 A1 2/2005 Gerrard et al.
2005/0059451 A1 3/2005 Shackleford
2005/0209001 A1 9/2005 Moshal
2006/0119044 A1 * 6/2006 Kekempanos et al. ....... 273/292
2006/0149561 A1 7/2006 Govender
2007/0155460 A1 7/2007 Burnside et al.
2007/0262528 A1 11/2007 McKee

OTHER PUBLICATIONS

Two Plus Two Poker Forums—Poll: Should anonymity be allowed in Rush Poker? p. 1 of 2, downloaded from the World Wide Web at http://forumserver.twoplustwo.com/28/internet-poker/poll-should-anonymity-allowed-rush-poker-694741/ on Jan. 29, 2010, 34 pages.

(Continued)

*Primary Examiner* — Damon Pierce
(74) *Attorney, Agent, or Firm* — McDonnell Boehnen Hulbert & Berghoff LLP

(57) ABSTRACT

A player of a card game, such as poker, may be presented with opportunities to replace one or more of the cards in his or her hand. For example, the player may be dealt a first set of cards, and then offered a first opportunity to replace one or more cards in the first set. The player may also be dealt a second set of cards, and then offered a second opportunity to replace one or more cards in the second set. Preferably, the first set and the second set of cards, when combined, form the player's hand of cards. The player may accept at least one of these two offers and, in doing so, may incur a cost for accepting one or more of the offers. This cost may be based on the difference between a first return associated with hand of cards played without replacement, and an expected second return associated with the offer(s) the player accepted.

46 Claims, 13 Drawing Sheets

(56) References Cited

OTHER PUBLICATIONS

Two Plus Two Poker Forums—Poll: Should anonymity be allowed in Rush Poker? p. 2 of 2, downloaded from the World Wide Web at http://forumserver.twoplustwo.com/28/internet-poker/poll-should-anonymity-allowed-rush-poker-694741/ on Jan. 29, 2010, 29 pages.

CardRunners Blog Network—David Benefield : Poker Blog, Sep. 12, 2008, Multiaccounting, downloaded from the World Wide Web at http://blogs.cardrunners.com/davidb/Multiaccounting, 2 pages.

Australian Patent Application No. 2010224425, Office Action dated Jun. 30, 2011, 2 pages.

* cited by examiner

METHODS AND DEVICES FOR CARD GAMES WITH CARD REPLACEMENT

CROSS-REFERENCE TO RELATED APPLICATIONS

This application is a continuation in part of the co-pending U.S. patent application with the Ser. No. 12/580,607, filed Oct. 16, 2009, which is hereby incorporated by reference in its entirety. This application is also a continuation in part of the co-pending U.S. patent application with the Ser. No. 12/580,615, filed Oct. 16, 2009, which is also hereby incorporated by reference in its entirety.

BACKGROUND

In various types of card games, such as but not limited to poker, instead of competing against other participants, a player may compete against a house. The house may be any type of game provider, such as a brick-and-mortar or online casino. The player's goal may be to achieve one of several possible winning hands through a combination of luck and strategy.

The house that provides a card game usually expects a marginal profit on each hand played. In order to achieve this profit, the house may seek to differentiate itself from other game providers by offering new card games, as well as new variations of well-known card games. Players may be relatively indifferent to standard versions of well-known card games, and therefore may find new variations of these card games fresh and exciting in comparison. Exciting card games also tend to encourage repeat play and return visits to the game provider. Thus, house profit is likely to increase when the house provides new variations of known card games.

SUMMARY

The methods and devices disclosed herein provide enhancements to card games by giving players an opportunity to exchange their cards at various stages of a card game. These exchanges may cause the player's hand to improve. As a result, players may benefit from finding the card game more enjoyable and therefore may engage in additional gameplay. Some of these exchanges may be associated with a cost to the player. Therefore, the house may also benefit from increased popularity, increased gameplay, more players, and/or a higher profit margin.

In a first embodiment, a player engages in a card game such as poker. The player's goal may be to form one of several predetermined winning hands of cards. Each winning hand may be associated with a specific return, or payout, to the player. For instance, a poker hand of three of a kind may return 3-to-1 (that is, the player receives three times his or her wager), while a full house may return 10-to-1. To facilitate the player's wagering, the player may be associated with an account that is either held by the house or by a third party.

Accordingly, the player may be dealt an initial hand of cards from a deck, and may be offered the opportunity to perform a free card replacement of one or more of these cards. If the player chooses to perform this first card replacement, the player may select one or more cards from his or her hand to be replaced, and hold the remaining cards. The selected cards may be discarded and replaced with an equal number of cards drawn from the deck and added to the player's hand. After this optional first replacement, the player may be shown, told, or may otherwise determine a first return on his or her hand of cards.

If the player is unsatisfied with this first return, the player may opt to select one or more cards for a second card replacement. However, the player may incur a cost for performing this second card replacement. In particular, the cost may be based on the difference between (a) the first return, and (b) the expected second return associated with replacing the cards the player has selected for the second card replacement.

The cost of the second card replacement may be provided to the player, and the player may decide whether to perform the second card replacement. If the player decides to perform the second card replacement and incur the associated cost, the player's selected cards may be discarded and replaced with new cards drawn from the deck. Also, the player's account may be debited by the cost. At this point, the game may end with the player being awarded the actual return of the player's hand. Alternatively, the player may be offered one or more additional opportunities to perform further card replacements.

In a second embodiment, a player also engages in a card game such as poker. The player may be dealt a first set of cards, and then offered a first opportunity to replace one or more cards in the first set. The player may also be dealt a second set of cards, and then offered a second opportunity to replace one or more cards in the second set. Preferably, the first set and the second set of cards, when combined, form the player's hand of cards. The player may accept at least one these offer(s). Like the first embodiment, the player may incur a cost for accepting the offer(s). This cost may be based on the difference between a first return associated with hand of cards played without replacement, and an expected second return associated with the offer(s) the player accepted. Accordingly, the player's account may be debited by the cost of the accepted offer(s).

In a third embodiment, a player also engages in a card game such as poker. The player may be dealt a plurality of card sets that, when combined, form a hand of cards. During or after the deal, the player may be offered an opportunity to replace the cards in one of the card sets. If the player accepts the offer, the player may choose a card set to replace, and may then receive a set of replacement cards with which to replace the chosen card set. Like the first and second embodiments, the player may incur a cost for accepting the offer. The cost may be based on the difference between a first return associated with playing the hand of cards without replacing the chosen set of cards, and an expected second return associated with playing the hand of cards with the set of replacement cards replacing the chosen set of cards.

Each of the embodiments described herein may be applied to any variation of poker, including but not limited to draw poker or stud poker. These variations also include community-card based poker, such as Texas Hold 'Em.

These and other aspects and advantages will become apparent to those of ordinary skill in the art by reading the following detailed description, with reference where appropriate to the accompanying drawings. Further, it should be understood that the foregoing overview is merely for purposes of illustration and is not intended to limit the scope of the invention as claimed.

DETAILED DESCRIPTION

Figure 1:
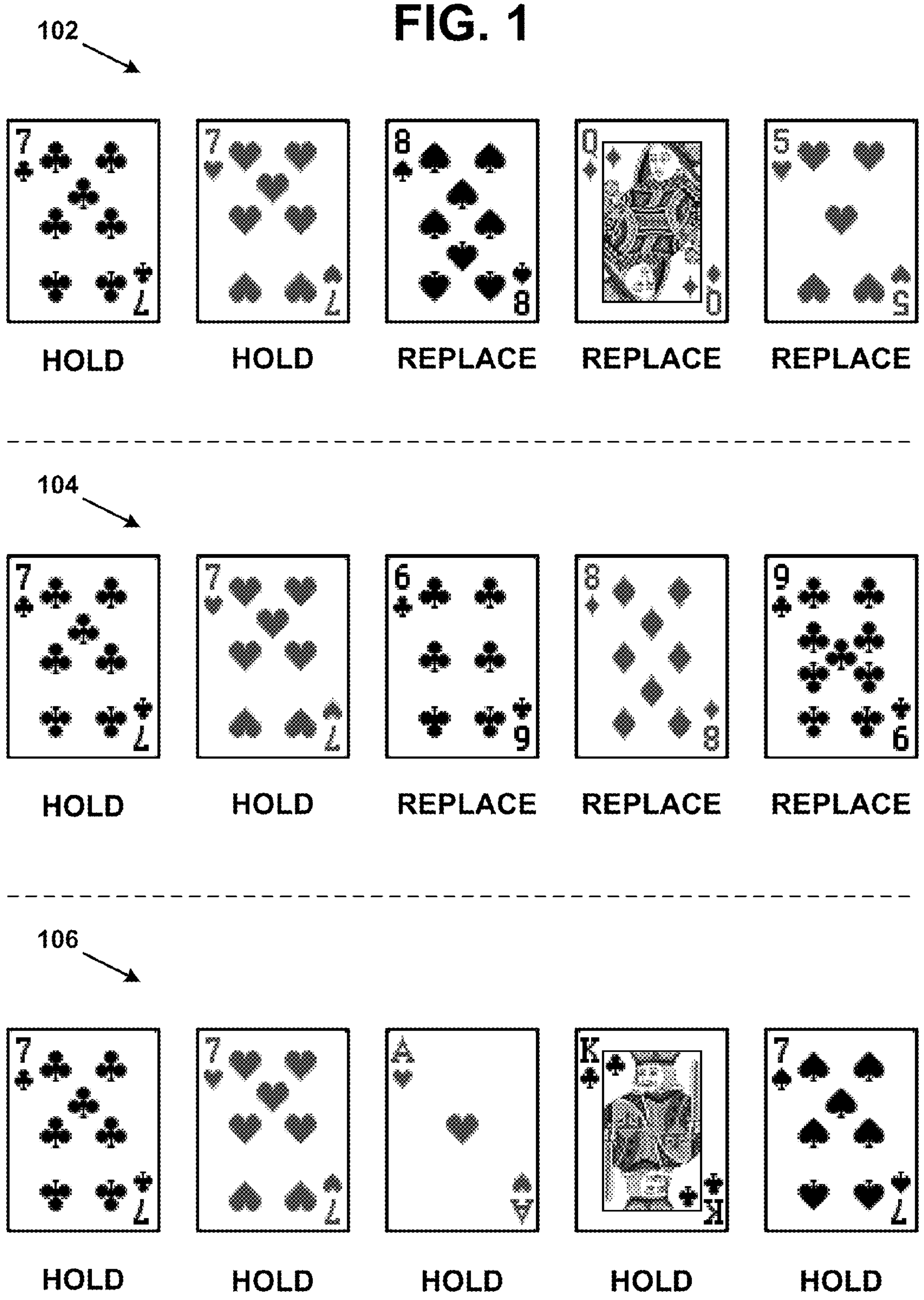
FIG. 1 illustrates replacement of cards in a hand of poker, in accordance with an example embodiment.

Card games that provide players with opportunities to improve their hands are presented. These opportunities may be associated with costs to be incurred by the player, should the player choose to take advantage of an opportunity and replace one or more chosen cards. The costs may be dynamically determined based on the player's expected return once the chosen cards are replaced. The card games disclosed herein may be played by humans, either as a table game, or via a computer medium. Alternatively, the card games may be played by a human against a computer opponent, or by two computers.

Herein the term "card game" preferably refers to a single instance or single play of a game such as poker. Thus, a card game may involve a card supply, such as a deck, being shuffled or otherwise randomized, the player engaging in play of the card game, and the card game coming to some form of conclusion. Then the card supply may be re-shuffled prior to the next card game. Alternatively, the player may engage in multiple plays of the card game, each with a respective conclusion, before the card supply is reshuffled.

I. Game Description

The embodiments herein are disclosed in the context of card games that preferably take place between a player and a house. These card games may use a standard playing card deck of 52 cards, divided into four suits. These four suits may be, for example, clubs, diamonds, hearts, and spades, or some other type of suit may be used. Therefore, each suit may contain 13 cards, ten of which are preferably labeled with ranks from 1 (ace) to 10, and three of which are preferably face cards with ranks of jack, queen, and king Alternatively, non-standard playing cards may be used as well without departing from the scope of the invention. Additionally, multiple decks of cards may be used as the supply of any cards drawn or dealt.

Typically, these card games allow a player to place a wager at the beginning of each play of the game. Then, the player may engage in the card game in an attempt to achieve a winning hand. The card game may have one or more possible winning hands, and each winning hand is preferably a specific combination of cards that is associated with a return. Preferably, the more difficult it is for the player to achieve the winning hand, the greater the return. Each return may be calculated based at least in part on the player's wager. For instance, the return for a given winning hand may be a particular multiple of the player's wager. If the player does not achieve a winning hand by the end of the card game, the player may lose his or her wager.

In order to facilitate convenient wagering, an account may be established for maintaining the player's credit balance. These credits may be or may represent a denomination of money, a representation of money, or items of value that can be exchanged for money. Alternatively, the credits may represent play money and have no actual value, thus allowing players to enjoy the card game without risking actual financial loss. The account may be managed either by the house or a third party, and from time to time the player may load the account with credits via cash payment, credit card, electronic funds transfer, or some other means.

While the embodiments herein may be used with any type of card game played against a house, the embodiments are described in the context of the popular game of poker. It should be understood that poker and other types of card games may be played according to a wide variety of rules. For instance, these card games may be played according to house rules of the game provider, or local or regional jurisdictional rules that vary the type of cards used, number of cards per hand, winning hands, returns for each winning hand, or other aspects of gameplay. Accordingly, the embodiments herein may be applied to these alternate rules as well.

There are two major variations of poker: draw poker and stud poker. Both draw poker and stud poker have many possible variations, or alternative or optional ways to play, and such variations of these games may be provided by a particular house or enforced within a particular jurisdiction. Thus, any description of poker games herein is intended to be for purposes of illustration, and should not be construed as limiting. Accordingly, many different variations of poker may be played while remaining consistent with the embodiments herein.

TABLE 1

Example winning hands in poker.

| Wining Hand | Return | Description |
|---|---|---|
| Royal Flush | 250-to-1 | A straight flush consisting of a sequence of cards from ten through ace of the same suit. |
| Straight Flush | 50-to-1 | Five cards in sequence and of the same suit. |
| Four of a Kind | 20-to-1 | Four cards of the same rank. |
| Full House | 10-to-1 | Three cards of a first rank and two cards of a second rank. |
| Flush | 6-to-1 | Five cards of the same suit. |
| Straight | 4-to-1 | Five cards of any suit in sequence. |
| Three of a kind | 3-to-1 | Three cards of the same rank. |
| Two Pair | 2-to-1 | Two cards of a first rank and two cards of a second rank. |
| One Pair | 1-to-1 | Two cards of the same rank. |

Table 1 provides an example listing of winning poker hands in the form of a pay table. Each winning hand is associated with a return. Generally speaking, the more difficult a winning hand is to achieve, the higher the return. Thus, a royal flush, the most difficult winning hand to achieve in Table 1, returns 250 credits for each credit the player wagers. Conversely, one pair, a relatively easy-to-achieve winning hand, returns only one credit for each credit wagered (in other words, the player breaks even when achieving one pair). When evaluating a player's hand against a table, such as Table 1, preferably only the best possible winning hand return is awarded to the player. Thus, a hand with three of a kind will only be awarded the return associated with three of a kind rather than the return associated with two of a kind.

It should be understood that the winning hands and returns are listed in Table 1 only for purposes of example. Accordingly, additional winning hands, as well as different returns, could be used. Furthermore, some winning hands may be conditioned upon card suit or rank. For instance, the winning hand of one pair may only apply when the pair consists of a rank of jack or higher, and the winning hand of a royal flush may only apply when the five cards are all hearts.

It should also be understood that the term "hand" is used for two purposes herein. A "hand" may refer to a series of gameplay events in a multiplayer card game, including cards being dealt, one or more rounds of wagering taking place, and then a player in the hand being determined to be the winner of the hand's pot. A "hand" may also refer to the cards dealt to a player, or used by a player, during the course of gameplay. Thus, a "hand" of cards may involve several individual players, and each of these players may have a "hand" of cards with which to play. The meaning of any instance of the term "hand" should be apparent from context, but if such meaning is not apparent, the term "hand" should be interpreted to have whichever meaning is the broadest and most inclusive.

Furthermore, prior to a hand of draw poker or stud poker, the player may be required place an initial wager, or ante. An ante is typically a token amount of money or value (e.g., one dollar) that the player provides before being dealt any cards. In some variations of poker, a player may not be required to provide an ante prior to each hand. Additionally, antes may be progressive, in that they may increase over time as more hands are played.

A. Draw Poker

Draw poker typically involves a player initially being dealt five cards from a standard 52-card deck. Alternatively, the player may initially be dealt more or fewer cards from a standard or non-standard deck. The goal of a player in draw poker may be to achieve a winning hand with a satisfactory return.

After the player has been dealt an initial hand, the player may be offered the opportunity to replace one or more of the cards in the hand. Replacing cards in a hand may be referred to as performing a card replacement, and may provide the player with a chance to improve the hand. FIG. 1 illustrates such a card replacement. In FIG. 1, the player has been dealt an initial hand 102 consisting of a seven of clubs, a seven of hearts, an eight of spades, a queen of diamonds, and a five of hearts. Thus, the player has achieved a winning hand of one pair. However, as discussed previously, the return on one pair may not be significant. Therefore, in order to improve his or her hand, the player may want to replace any one or more of these cards.

Initial hand 102 shows the player choosing to replace the eight of spades, queen of diamonds, and five of hearts, while holding the two sevens. Presumably, the player does this in an attempt to improve to two sevens from a winning hand of one pair into a better winning hand, such as two pair, three of a kind, full house, or four of a kind Once the player has chosen the cards to be replaced, these cards may be discarded and replacement cards may be drawn from the deck.

It should be understood that it makes no difference whether a player selects the cards to be replaced or selects the cards to be held. Since any card not replaced is held and any card not held is replaced, the outcome is the same. Thus, while the following embodiments refer to the player selecting cards to be replaced, the player may actually select the cards to be held, and therefore implicitly also select the cards to be replaced.

FIG. 1 also shows the player's hand 104 as it stands after the replacement. In this example, the player has drawn a six of clubs, an eight of diamonds, and a nine of clubs. These cards do not materially improve the player's hand, as the player still has only one pair. In a traditional game of draw poker, the player's hand after this first card replacement would be applied to a pay table, such as Table 1, and the player would be awarded, for example, a 1-to-1 return. In such a situation, the player may be disappointed with breaking even. The player may also be caught up in the gameplay of draw poker, and willing to incur an additional cost for another chance to achieve a better hand.

Accordingly, draw poker, as well as other types of card games, may be enhanced by optional rules providing a player with further opportunities to replace one or more cards in his or her hand. Each card replacement may be associated with a cost, and the cost may be based on the relative advantage that executing the card replacement may provide to the player. By offering additional card replacements, the player's interest in the card game may remain high even if the player is unsatisfied with his or her hand after the first card replacement.

From hand 104, the player may select the six of clubs, eight of diamonds, and nine of clubs for a second card replacement, thus holding the two sevens. Presumably, the player is once again attempting to improve his or her one pair into two pair, three of a kind, a full house, or four of a kind. Alternatively, the player could select the seven of clubs or the seven of hearts for replacement, while holding the remaining cards in order to potentially achieve a straight by drawing a five or a ten as the replacement for the seven of hearts.

Preferably, the cards selected for replacement in the hand 104 are discarded, and replacement cards are drawn from the deck. These replacement cards may be added to the player's hand, and a cost associated with the replacement may be debited from the player's account. Example replacement cards of an ace of heats, king of spades, and seven of clubs are shown in hand 106. After this replacement takes place, the player holds three of a kind, with three sevens.

Once this second card replacement is complete, the card game may end with the player being awarded a return based on the cards in the player's hand and a pay table such as Table 1. Alternatively, the player may be offered one or more additional card replacements. Thus, the player may continue to replace the cards in his or her hand until he or she is satisfied with the result or has run out of credits. However, the player may be limited to no more than a given number of card replacements per card game. Each card replacement may involve the player replacing a different number of cards in his or her hand and/or incurring a different cost.

It should be understood that any cards the player discards during a card replacement may be placed in a discard pile. Preferably, cards in the discard pile are not used for the remainder of the card game. After the card game has ended, all cards may be gathered, shuffled or otherwise randomized, and used as a card supply for a subsequent card game.

B. Stud Poker

Stud poker typically involves a player initially being dealt fewer than five cards from a standard 52-card deck, and then being dealt additional cards in one or more rounds, until the player has been dealt five or more cards. Alternatively, the player may be dealt a different number of cards from a standard or non-standard deck. Like draw poker, the goal of a player in stud poker may be to achieve a winning hand with a satisfactory return. However, unlike draw poker, in stud poker the best combination of cards that can be constructed from any five cards in the player's hand may be used to determine the player's payout. For purposes of illustration, a variation of stud poker is described below. However, the scope of the invention includes other variations as well.

Figure 2A:
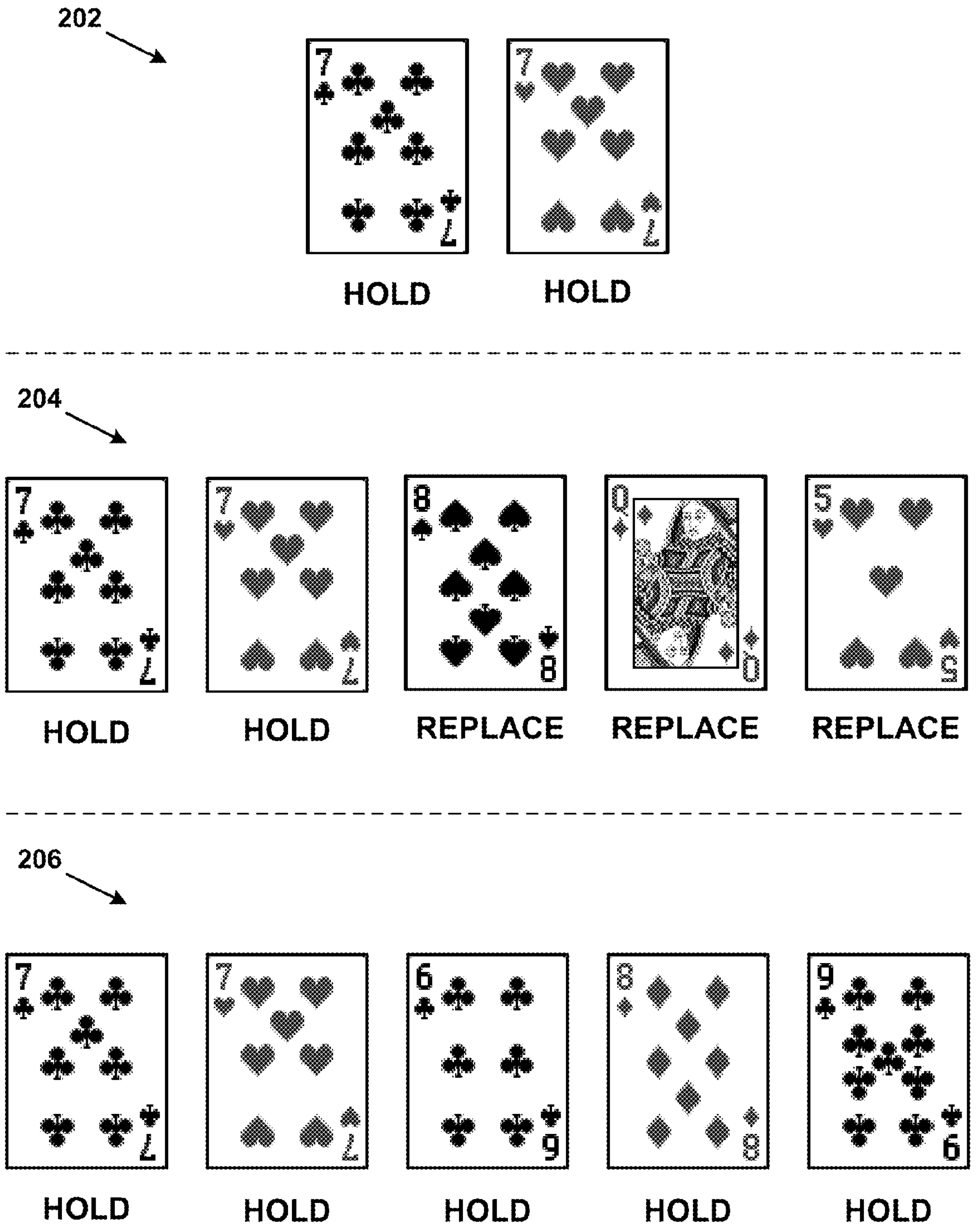
FIG. 2A also illustrates replacement of cards in a hand of poker, in accordance with an example embodiment.
Figure 2B:
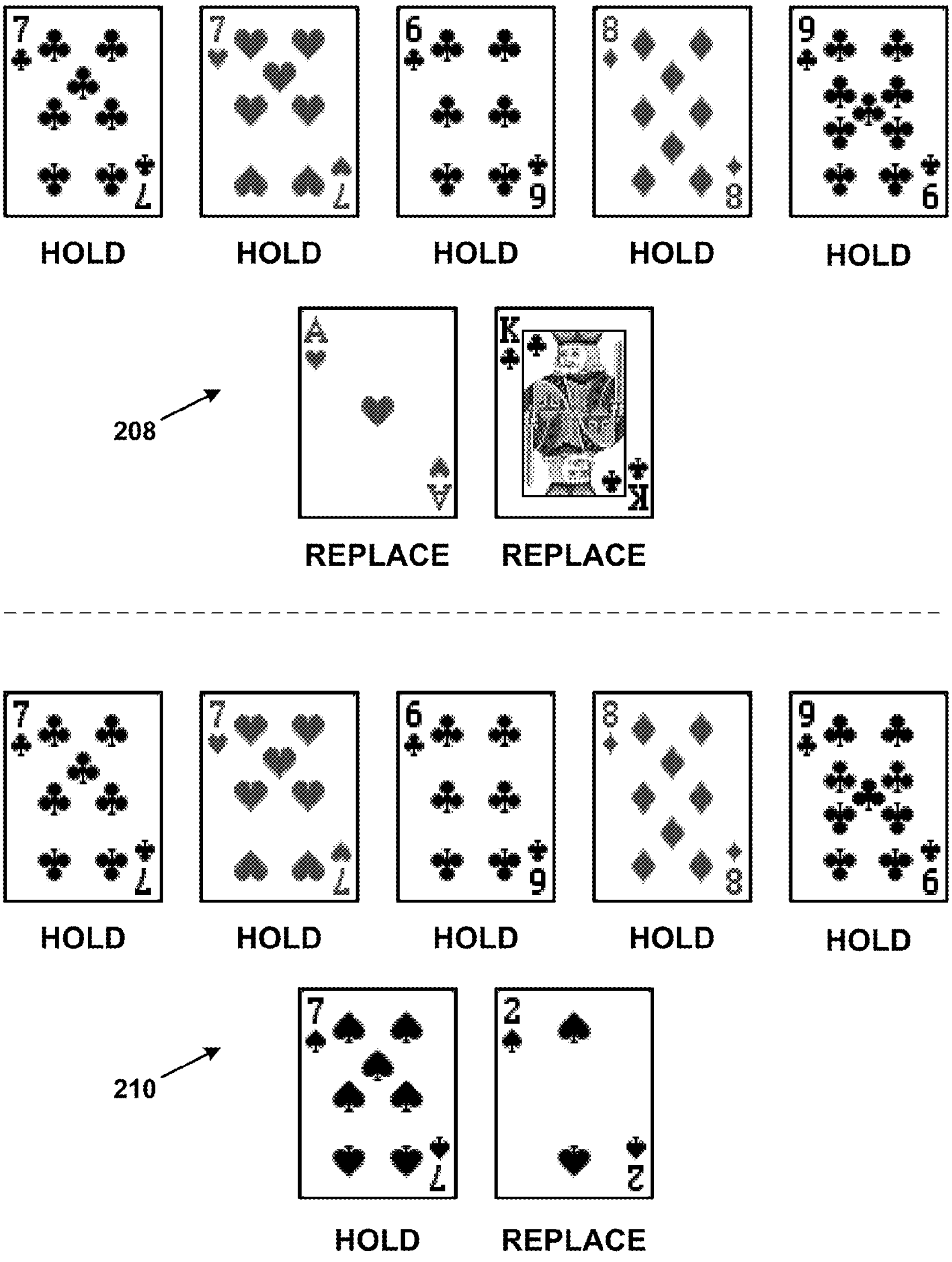
FIG. 2B once again illustrates replacement of cards in a hand of poker, in accordance with an example embodiment.

FIGS. 2A and 2B show an example hand of stud poker being dealt to a player, where the player is able to replace one or more cards in the hand. The player may be given opportunities to replace cards as the hand is being dealt or after all cards in the hand are dealt. For purposes of illustration, the same cards used in the example of FIG. 1 are also used in the example of FIGS. 2A and 2B, but these two examples are preferably independent of one another.

As shown in FIG. 2A, the player may be initially dealt a first set of cards to form a first partial hand 202 of two cards. The first partial hand 202 comprises a seven of clubs and a seven of hearts. Once these cards are dealt, the player may be offered a first opportunity to replace these cards, and there may be a cost associated with accepting such an offer. Since the player has been dealt a pair, the player will likely hold the cards in the first partial hand 202.

Accordingly, FIG. 2A also shows the player being dealt a second set of cards to be combined with the first partial hand to form a second partial hand 204. The second set of cards comprises an eight of spades, a queen of diamonds, and a five of hearts. Once these cards are dealt, the player may be offered a second opportunity to replace cards. This opportunity may be to replace some of the cards in the second set, all of the cards in the second set, or cards from both the first and second sets. There may be a cost associated with accepting the second offer. Since the cards in the second set do not appear to materially improve the player's hand, the player may choose to accept the offer and replace the cards in the second set. The player's account may be debited by an associated cost.

Thus, the player may discard the eight of spades, queen of diamonds, and five of hearts, and receive a six of clubs, an eight of diamonds, and a nine of clubs as replacement cards, to form the partial hand 206. At this point, the player not only still has the pair of sevens, but also has a substantial likelihood of achieving a straight. Although the player may be offered a third opportunity to replace one or more cards in the partial hand 206, the player may opt to hold these cards until he or she is dealt additional cards.

Turning to FIG. 2B, the player may be dealt a third set of cards which may be combined with the partial hand 206 to form the partial hand 208. The third set of cards may comprise an ace of hearts and a king of clubs. Once the third set of cards is dealt, the player may be offered a fourth opportunity to replace cards in the partial hand 208. This opportunity may be to replace some of the cards in the third set, all of the cards in the third set, or cards from the first, second, and/or third sets. There may be a cost associated with accepting such an offer. Since the cards in the third set do not materially improve the player's hand, the player may choose to replace these two cards. Accordingly, the player's account may be debited by the associated cost.

Therefore, the ace and hearts and the king of clubs may be discarded from the partial hand 208 and replaced with a fourth set of cards comprising a seven of spades and a two of spades. After this replacement, the player may be holding the partial hand 210. With the partial hand 210, the player has three sevens and thus has three of a kind Nonetheless, the player may be offered a fifth opportunity to replace cards in the partial hand 210. This opportunity may be to replace some of the cards in the fourth set, all of the cards in the fourth set, or cards from the first, second, third, and/or fourth sets. Once again, there may be a cost associated with accepting such an offer.

As shown in FIG. 2B, the player may choose to accept this offer and replace one of the cards in the fourth set, presumably in an attempt to improve the three of a kind into four of a kind or a full house. (For sake of simplicity, further replacements are not shown in FIG. 2B.) Alternatively, the player may hold all cards in the partial hand 210, and choose to accept the payout associated with three of a kind It should be understood that the payout received by the player may be calculated based on a pay table, such as Table 1.

Nonetheless, the examples of FIGS. 1, 2A, and 2B are merely for purposes of illustration, and not intended to be limiting. Thus, a player may be offered opportunities to replace any number of cards in his or her hand, at any point in time, and still be in accordance with the embodiments herein. Furthermore, cards may be dealt to the player in other arrangements, sequences, and quantities.

For instance, in an example embodiment that resembles the popular Texas Hold 'Em variation of poker, a player may make an initial wager, or ante. Then, the player may be dealt two cards ("hole" cards). The player may either fold, forfeiting the ante, or make a second wager to continue. This further wager may be equal to the ante, or may take on other values.

After the second wager, the player may be dealt three cards (the "flop"), and again may be given the opportunity to either fold, forfeiting the ante, or make a third wager to continue. After the third wagering round, the player may be dealt a sixth card (the "turn"), and once more may be given the opportunity to fold, forfeiting the ante, or make a fourth wager to continue. After the fourth wagering round, the player may be dealt a seventh card (the "river") and given a final opportunity to either fold or wager. Like the second wager, the third, fourth, and fifth wagers may be equal to the ante or may take on other values.

If the player does not fold, and remains in the game after then seventh card is dealt, the best poker hand consisting of five cards chosen from the player's seven cards may be compared to a pay table, such as Table 1. The player may then be awarded the payout (if any) that his or her hand has achieved according to the pay table.

During the course of a hand, the player may be given various options to replace certain cards. Accordingly, the player may be charged a cost for such a card replacement, and this cost may be based on a difference between the present payout (without replacing the cards) and an expected payout that would occur if the cards are replaced. For instance, after the hole cards are dealt, the player may replace the hole cards. Similarly, after the flop is dealt, the player may replace the hole cards and/or the flop. Likewise, after the turn is dealt, the player may replace the hole cards, the flop, and/or the turn. In the same way, after the river is dealt, the player may replace any of the hole cards, the flop, the turn, and/or the river.

II. Calculating Costs

Regardless of whether the game being played is draw poker, stud poker, or another card game, each time a player is offered to replace one or more cards in his or her hand, this replacement may be associated with a cost to the player. Preferably, the cost of replacing a particular set of cards is proportional to the expected gain, or a relative advantage, that replacing those cards will provide the player.

For example, in the case of the partial hand 208, the player has a pair of sevens, which is a winning hand that returns 1-to-1. A pay table that maps combinations of cards to returns, such as the pay table of Table 1, may be used to determine this return. Thus, assuming that the player wagered 100 credits on the hand, the player will receive a return of 100 credits even if the player declines to perform any additional card replacements.

If the expected return associated with replacing the ace of hearts and the king of clubs is 147 credits, then the expected cost to the house for performing the replacement is 147−100=47 credits. Thus, in order to break even, the house should charge the player at least 47 credits to perform the replacement, which is the difference between 100 credits and the expected return associated with replacing the other three cards. The house may add an additional house margin to this cost. For instance, the house may add a margin of 5% to the cost and charge the player 50 credits (rounded up).

In the case of partial hand 210, the player may relinquish the two of spades to seek a winning hand with a potentially higher return. Assuming again that the player initially wagered 100 credits on the hand, the player will receive a return of 300 credits for the hand's three of a kind If the expected return associated with replacing the two of spades is 323 credits, then the expected cost to the house for performing the replacement is 323−300=23 credits. Thus, in order to break even, the house should charge the player at least 23 credits to perform the replacement, which is the difference between 300 credits and the expected return associated with replacing the tow of spades. Again, the house may add an additional house margin to this cost. For example, adding a house margin of 5% to the cost will result in charging the player 25 credits (rounded up).

The expected return associated with replacing a particular set of cards may be calculated in a number of ways. For instance, the expected return may be based just on the cards in the player's hand. However, the remaining cards in the deck may also be considered, as well as any cards that have already been discarded. The costs associated with any offers provided at each stage of the card game may be calculated dynamically, calculated based on statistical tables, or some combination of both.

One method of calculating an expected return associated with replacing a given set of cards in the player's hand is to calculate, based on the cards being held by the player, the cards discarded by the player, and the cards remaining in the deck, the probability of the player achieving each winning hand in the pay table. Then, each of these probabilities may be multiplied by the return associated with the respective winning hand to determine an expected return. Thus, the cost of a card replacement may be dynamically calculated based on the state of the game and a pay table.

For example, consider partial hand 210. In particular, assuming a 52-card deck, two cards were dealt in the first set to form partial hand 202, three more were dealt in the second set to form partial hand 204, the three cards in the second set were replaced to form partial hand 206. Two more cards were dealt in the third set to form partial hand 208, and those two cards were replaced to form the partial hand 210. Thus, a total of 12 out of 52 cards from the deck have been dealt, leaving the deck with 40 cards. Thus, the probability of the player receiving a seven of diamonds to achieve four of a kind is 1/40. Similarly, the probability of the replacement of the two of spades resulting in other improved hands (such as a full house), as well as other non-improved hands, can also be calculated. The cost of the card replacement for partial hand 210 may then be calculated as the difference in the player's expected returns between (a) the player's current hand, and (b) the average of all potential outcomes of replacing the two of spades.

In some situations, the cost of a card replacement may be negative. In these situations, the house may effectively "pay" the player to replace one or more of the cards in his or her hand. For example, suppose that the player has a straight flush. If the player replaces one or more of his or her cards, the expected return of the resulting hand after this card replacement may be less than the return on a straight flush. Thus, it behooves the house to attempt to convince the player to undertake the card replacement.

In order to do so, the house might offer the card replacement for free, or might offer the player a number of credits to perform the card replacement. For instance, if performing the card replacement lowers the player's expected return by 20 credits, the house might offer the player up to 20 credits to perform the card replacement.

Nonetheless, it should be understood that the embodiments herein are not limited to just these methods of calculating a cost, and other methods may be used instead of, or in conjunction with, these methods.

III. Game Playing Environments

In addition to being played as table games, the embodiments of card games described herein may be facilitated through the interconnection of computers and computer networks. The advantages of computerized gameplay include allowing the player to engage in the card games from the privacy of his or her own home, or via a mobile device from virtually anywhere.

Figure 3:
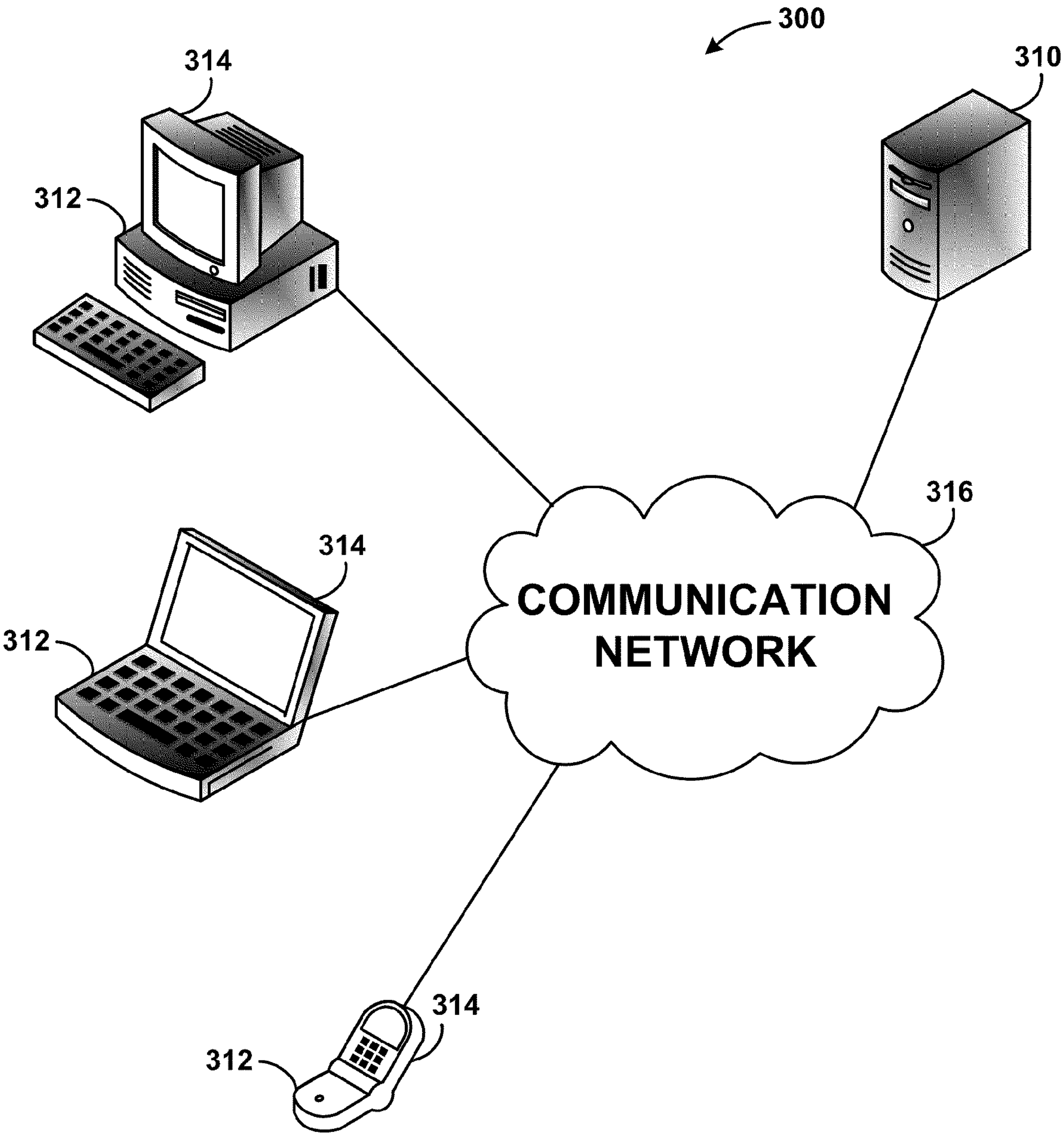
FIG. 3 is a diagram of a client/server networked computing system that may be used to facilitate card games, in accordance with an example embodiment.

FIG. 3 depicts an example of such a computerized arrangement. It should be understood, however, that this and other arrangements and processes described herein are set forth for purposes of example only, and other arrangements and elements (e.g., machines, interfaces, functions, orders of elements, etc.) can be added or used instead, and some elements may be omitted altogether. Further, as in most computer and communication architectures, those skilled in the art will appreciate that many of the elements described herein are functional entities that may be implemented as discrete components or in conjunction with other components, in any suitable combination and location. For example, systems and methods for facilitating the playing of games over a communication network are described in published PCT application WO 03/093921 A2, which is incorporated by reference herein.

In FIG. 3, the system 300 includes the gaming server 310 and the client devices 312, each preferably having a display 314. The gaming server 310, and the client devices 312 may be capable of communicating with each other by means of the communication network 316. The communication network 316 may be a public Internet Protocol (IP) network such as the Internet, a private IP network, or a public or a private network that operates according to other communication protocols. Thus, for instance, the client devices may be personal computers, laptops, or wireless communication devices such as cell phones.

Furthermore, the communication network 316 may be purpose-built or hardcoded network designed for the support of networked games. For example, the gaming server 310 may be a mainframe computer and the client devices 312 may be so-called "dumb terminals" that only communicate with the gaming server 310. Thus, the communication network 316 may only comprise communication links between the devices they connect. Alternatively, the gaming server 310 and one or more client devices 312 may be combined into a standalone gaming machine, such as a video game console.

The client devices 312 and the gaming server 310 may include various computing technologies, such as those that are semiconductor-based, magnetic, optical, acoustic, or biological in nature, any combination of these computing technologies, or any other technology known today or developed in the future, that can be used in conjunction with computational devices.

A. Server Devices

The gaming server 310 may comprise a computing device with input, output, processing, storage, and memory functions. The gaming server 310 may be a form of personal computer, or may be physically designed for server operation. For example, the gaming server 310 may be a rack-mounted or blade server component. With respect to the depiction of the gaming server 310 in FIG. 1, the gaming server 310 may actually take the form of multiple physical components or computers that are co-located or distributed. For example, the gaming server 310 may be a cluster of computing devices that operate in conjunction with one another to enable networked games. This cluster may be in a particular physical location, such as an Internet service provider (ISP), or may operate over a network between multiple physical locations.

The gaming server 310 may run a standalone or distributed operating system to enable server functions. This operating system may be based on MICROSOFT WINDOWS®, MAC OS®, LINUX®, or various other technologies. These operating systems preferably support multiple processes or threads of execution so that a single gaming server 310 can support a potentially large number of networked games simultaneously. Additionally, the gaming server 310 may be provisioned with a network connection.

The gaming server 310 preferably operates under control of a server-stored program (not shown) capable of enabling the client devices 312 to participate in one or more networked games. The stored program in the gaming server 310 may also maintain a dynamic register of all participants admitted to, and actively participating in, a networked game, together with data representative of the corresponding networked game.

Additionally, the gaming server 310 may contain, or have access to, accounts associated with each of these participants. Thus, the gaming server 310 may add credits to or debit credits from these accounts in accordance with the networked game being played. Furthermore, the gaming server 310 may have an interface from which a given participant may access his or her account in order to add more credits, or to cash out the account's credit balance. Moreover, the gaming server 310 may also have an administrative interface, from which an administrator of the gaming server 310 can add, delete, or modify accounts or game settings.

B. Client Devices

The client devices 312 may comprise personal computers, computer terminals, laptop computers, wireless communication devices such as cell phones, personal digital assistants, or similar devices. Furthermore, the client devices 312 may operate under an operating system such as MICROSOFT WINDOWS®, MAC OS®, or LINUX®, and are preferably provisioned with a web browser and network connection.

Using the client device 312, card games may be facilitated by a client process (not shown) that executes on the client device 312, and the server-stored program (not shown), or server process, that executes on the gaming server 310. In order to play a card game from any client device 312, a client process may first be downloaded, for example, from the gaming server 310 to the client device 312. The downloaded client process may then be installed in the client device 312, where after it is ready for execution. Alternatively, the client process may execute from within a World Wide Web browser of the client device 312. In either case, once the client process is launched, communication between the client device 312 and the gaming server 310 may then proceed.

The output functions of client devices 312 may comprise a graphical user interface (GUI) rendered on display 314. Such a GUI may represent networked game information in some combination of graphics and text. For example, a GUI on display 314 may represent the state of a card game associated with the client device 312, and include options to perform the acts of playing the card game, and, during the course of the card game, accepting or rejecting offers to redeal, replace, or discard cards. The client process executing on the client device 312 may display different trade marks, color schemes, or "look and feel" depending on the card game being played.

C. Functional Model of Gaming Servers and Client Devices

Figure 4:
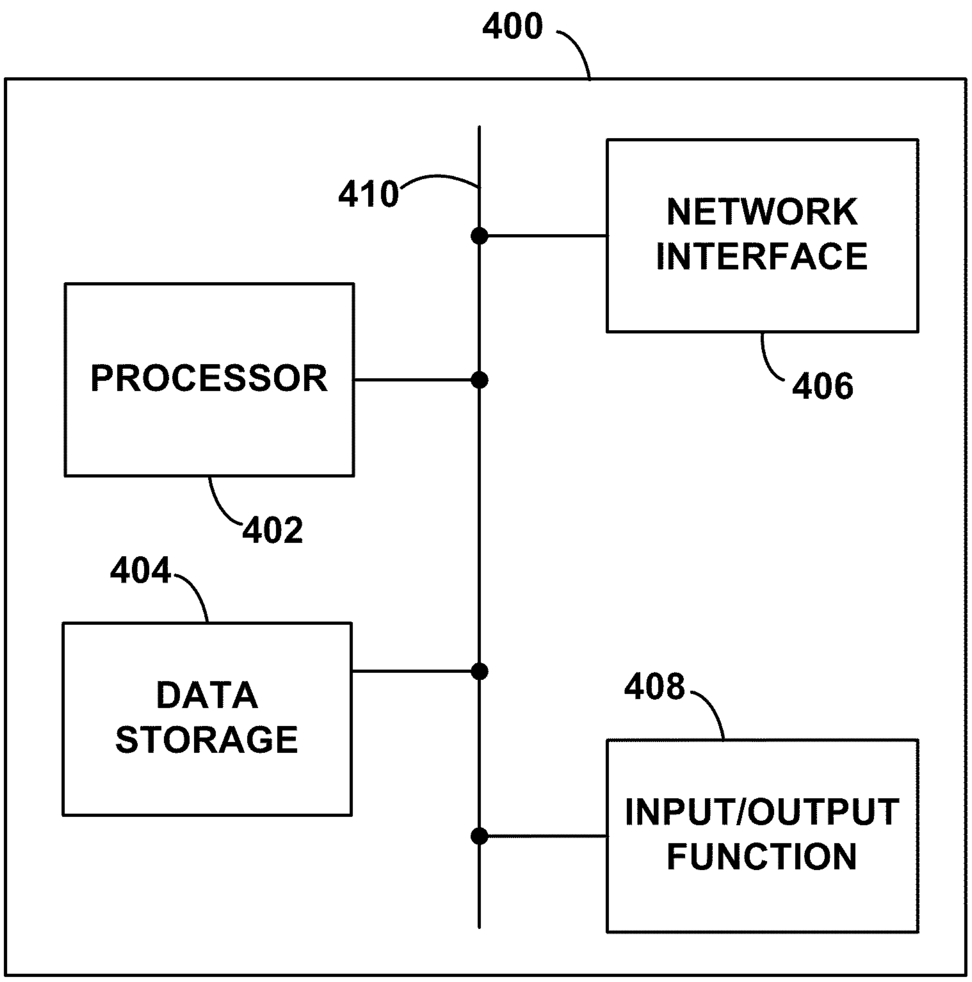
FIG. 4 is a block diagram of a computing device that may be used to execute part or all of a computerized card game, in accordance with an example embodiment.

FIG. 4 is a simplified block diagram depicting an example representation of computing device 400. Gaming servers, such as the gaming server 310, and/or client devices, such as the client devices 312, may be arranged according to such an example representation. FIG. 4 illustrates some of the functional components that would likely be found in a computing device that operates in accordance with the embodiments herein. The computing device 400 preferably includes a processor 402, data storage 404, a network interface 406, and an input/output function 408, all of which may be coupled by a system bus 410 or a similar mechanism.

The processor 402 preferably includes one or more central processing units (CPUs), such as one or more general purpose processors and/or one or more dedicated processors (e.g., application specific integrated circuits (ASICs) or digital signal processors (DSPs), etc.) The data storage 404, in turn, may comprise volatile and/or non-volatile memory and can be integrated in whole or in part with the processor 402. Alternatively, part or all of the data storage 404 may be external to computing device 400, and thus may take the form of remote storage or network storage. The data storage 404 preferably holds program instructions executable by the processor 402, and data that is manipulated by these instructions, to carry out various functions described herein. Alternatively, the functions can be defined by hardware, firmware, and/or any combination of hardware, firmware and software.

By way of example, the data in the data storage 404 may contain information associated with performing any of the methods, processes, or functions described herein or represented by any of the accompanying figures. For example, the data storage 404 may contain data associated with the state of a card game, data associated with a player's account, and so on. The data storage 404 may also contain program instructions that are executable by the processor 402 to perform any of the gaming server or client device methods, processes, or functions presented herein or represented by any of the accompanying figures.

The network interface 406 may take the form of a wireline connection, such as an Ethernet, Token Ring, SONET, or T-carrier connection. The network interface 406 may alternatively or additionally take the form of a wireless connection, such as IEEE 802.11, BLUETOOTH®, CDMA, WIMAX®, UMTS®, LTE®, or any other interface used to communicate. However, other forms of physical layer connections and other types of standard or proprietary communication protocols may be used over network interface 406. Furthermore, the network interface 406 may comprise multiple physical or logical network interfaces, each capable of operating according to the same or different protocols.

The input/output function 408 facilitates user interaction with the computing device 400. The input/output function 408 may comprise multiple types of input devices, such as a keyboard, a mouse, a touch screen, and so on. Similarly, the input/output function 408 may comprise multiple types of output devices, such as a monitor, printer, or one or more light emitting diodes (LEDs). Additionally or alternatively, computing device 400 may support remote access from another device, via the network interface 406 or via another interface (not shown), such an RS-232 port.

IV. Example Methods

FIGS. 5-12 are message flow diagrams and flow charts of methods in accordance with example embodiments of this invention. Each of these figures depicts a gaming server conducting at least one card replacement. All cards dealt to a player or drawn by the player in a card game are presumed to be determined randomly from a card supply such as, but not limited to, a standard 52-card deck. Additionally, for purposes of illustration, each of the embodiments depicted in FIGS. 5-12 describe a limited number of card replacements. However, each of these embodiments may include further card replacements that are not shown in FIGS. 5-12.

It should be understood that each of the methods illustrated by these figures may include more or fewer steps. Furthermore, the steps of any two or more of these message flow diagrams and flow charts can be combined with one another, in whole or in part, without departing from the scope of the embodiments herein. Moreover, the costs of card replacement in each of the example embodiments related to FIGS. 5-12 may be determined according to any calculation, including those described in Section III of this specification. Additionally, although FIGS. 5-12 describe a gaming server making an offer, to a client entity, to replace at least some of the client entity's cards, any resulting replacement may be initiated by the client entity. Also, where any of the example embodiments related to FIGS. 5-12 result in a player being dealt more than five cards, the player's best five-card hand may be determined and compared to a pay table, such as Table 1.

Figure 5:
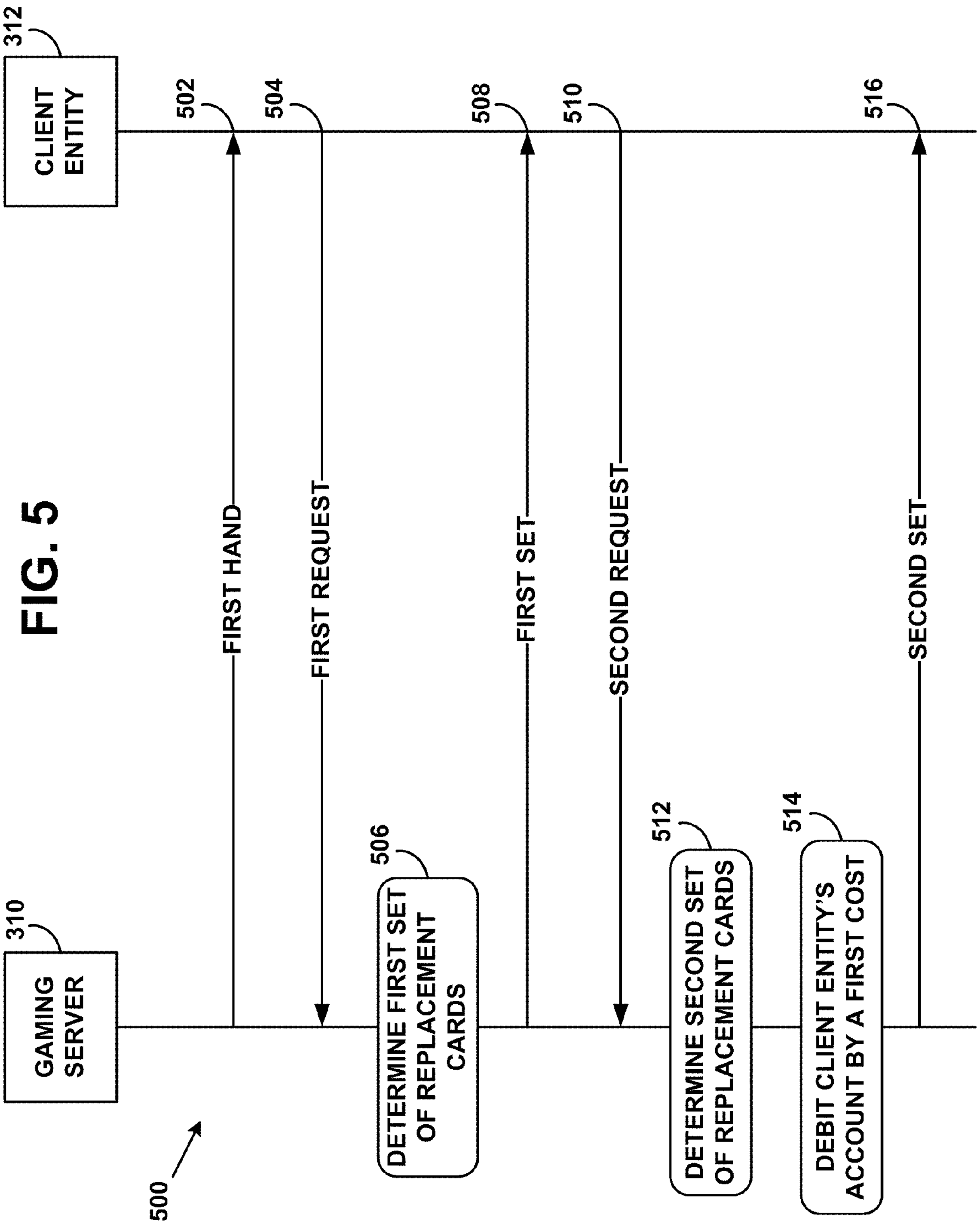
FIG. 5 is a first message flow diagram, in accordance with an example embodiment.

FIG. 5 depicts a message flow 500 for facilitating a first and a second card replacement. At step 502, the gaming server 310 may transmit a representation of a first hand to the client entity 312. Then, at step 504, the client entity 312 may transmit a first request for card replacement to the gaming server 310. The first request may include either one or more cards to be replaced, one or more cards to be held, or both. In response to receiving this first request, at step 506 the gaming server 310 may determine a first set of replacement cards, and at step 508, the gaming server 310 may transmit a representation of this first set to the client entity 312.

After receiving the first set of replacement cards, the client entity 312 may transmit a second request for replacement cards to the gaming server 310. In response to receiving the second request, at step 512 the gaming server 310 may determine a second set of replacement cards. Additionally, at step 514, the gaming server 310 may debit the account of the the client entity 312 by a first cost. The first cost may be determined at any point prior to step 514, and may be proportional to the expected gain, or a relative advantage, that replacing the chosen cards in the player's hand with the second set will provide the player. Then, at step 516, the gaming server 310 may transmit a representation of the second set to the client entity 312.

Figure 6:
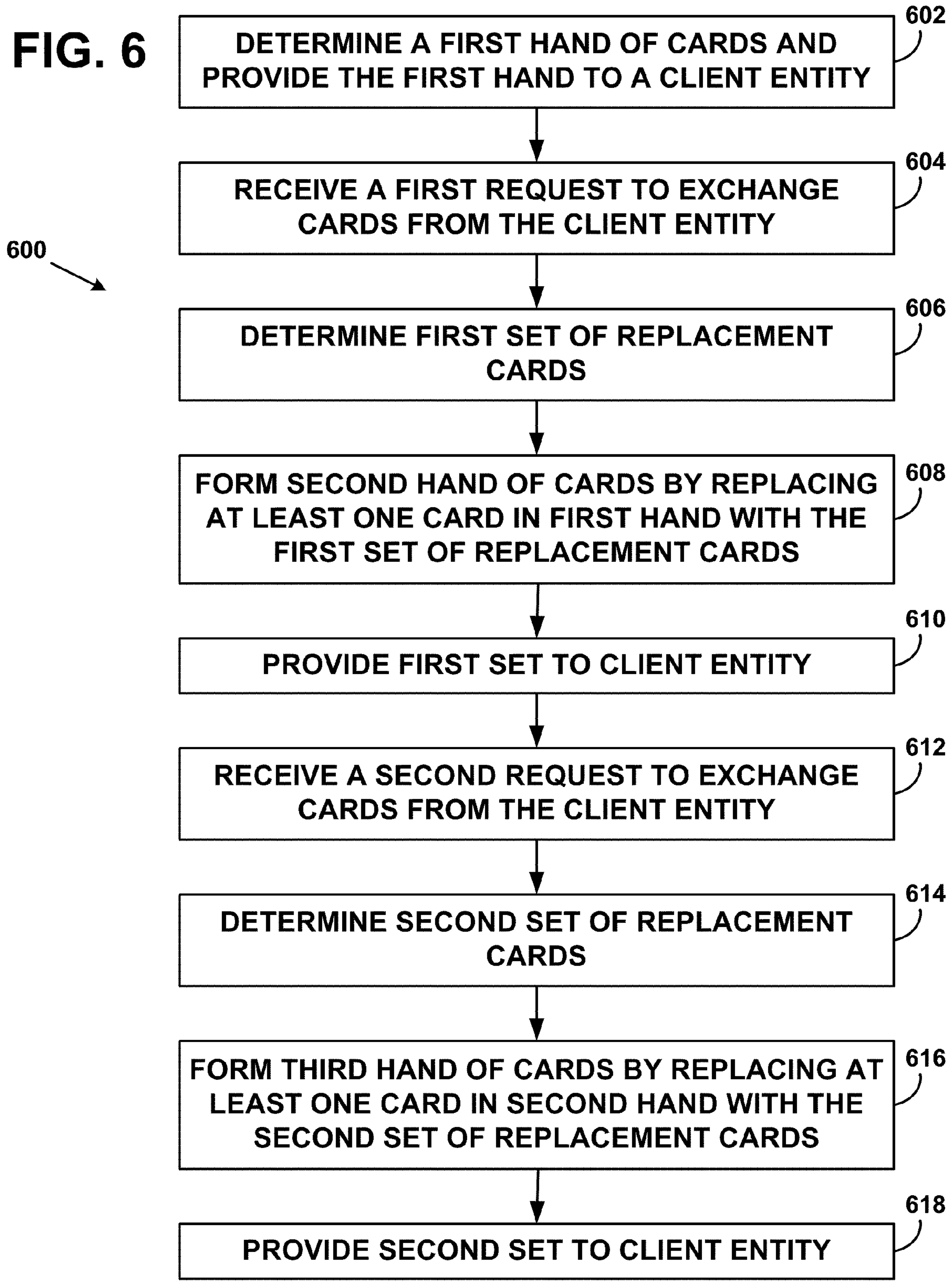
FIG. 6 is a first flow chart, in accordance with an example embodiment.

FIG. 6 is a flow chart of method 600, also for facilitating replacement of one or more cards in a hand. At step 602 a first hand of cards is determined and provided to a client entity, such as client entity 312. Preferably the client entity is associated with an account. Then at step 604, a first request to exchange cards is received from the client entity. In response to receiving this first request, a first set of replacement cards are determined at step 606 and a second hand is formed at step 608. Preferably, the second hand is formed by replacing at least one card in the first hand with the first set. Then, at step 610, at least the first set may be provided to the client entity.

At step 612, a second request to exchange cards is received from the client entity. In response to receiving this second request, at step 614 a second set of replacement cards may be determined, and a step 616 a third card of hands may be formed by replacing at least one card in the second hand with the second set. Then, at step 618, at least this second set may be provided to the client entity.

Figure 7:
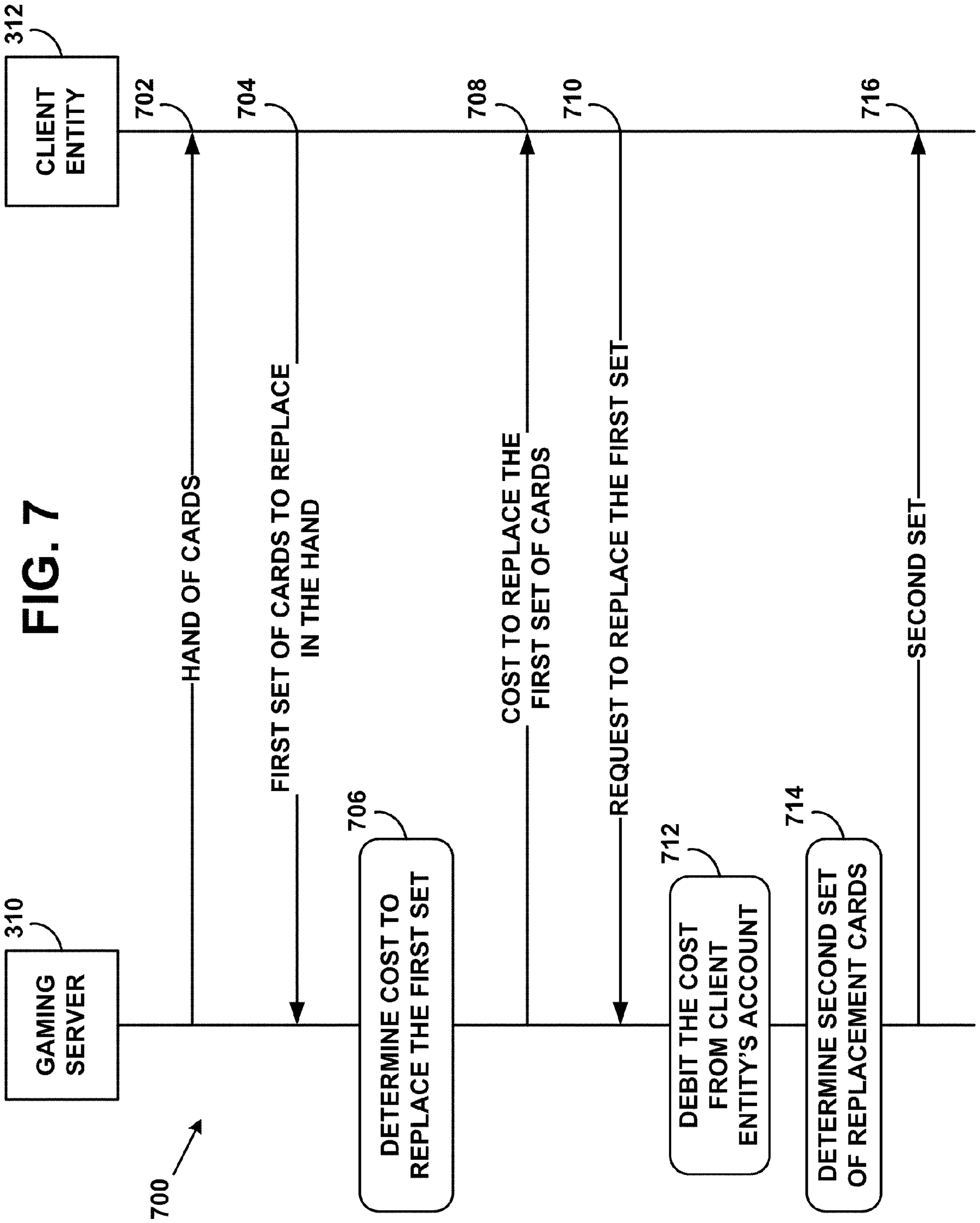
FIG. 7 is a second message flow diagram, in accordance with an example embodiment.

FIG. 7 depicts another message flow 700 for facilitating card replacement. At step 702, the gaming server 310 may transmit a representation of a hand of cards to the client entity 312. The client entity 312 may then select a first set of one or more cards from the hand to replace, and at step 704 transmit a representation of this first set to the gaming server 310. In response to receiving the first set, at step 706 the gaming server 310 may determine a cost to replace the first set, and at step 708 may transmit a representation of this cost to the client entity 312. Preferably, the cost is based on the difference between (a) the return of the hand of cards without any cards being replaced, and (b) the expected return of the hand of cards if the first set is replaced by cards chosen randomly from those remaining in the card supply.

The client entity 312 may consider whether to carry out the replacement of the first set based at least on this cost. If the client entity 312 chooses to replace the first set, at step 710 the client entity 312 may transmit a request to the gaming server 310 to replace the first set. In response to this request, the gaming server 310 may, at step 712, debit the cost from the account of the client entity 312, and, at step 714, determine a second set of replacement cards to replace the first set. Preferably, the cards in the second set are chosen randomly from those remaining in the card supply. Then, at step 716, the gaming server 310 may transmit a representation of the second set to the client entity 312.

Figure 8:
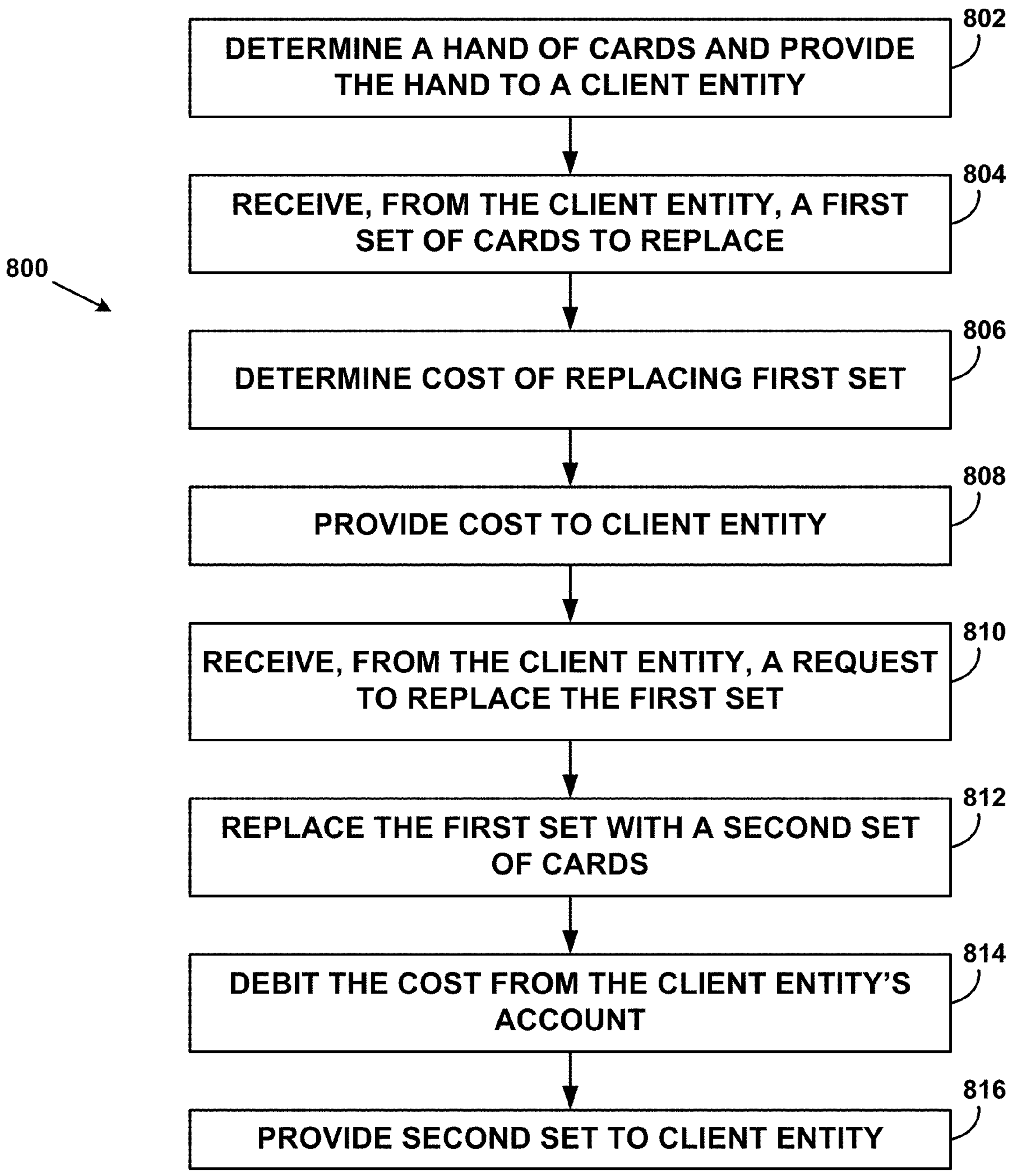
FIG. 8 is a second flow chart, in accordance with an example embodiment.

FIG. 8 is a flow chart of a method 800 also for facilitating replacement of one or more cards in a hand. At step 802, a hand of cards may be determined and provided to a client entity, such as client entity 312. At step 804, a first set of cards to replace may be received from the client entity, where this first set of cards is part of the hand of cards provided to the client entity. At step 806, a cost for replacing the first set may be determined. Preferably, the cost may be based on the difference between (a) the return of the hand of cards without any cards being replaced, and (b) the expected return of the hand of cards if the first set is replaced by cards chosen randomly from those remaining in the card supply. Then, at step 808, the cost may be provided to the client entity.

At step 810, a request to replace the first set may be received from the client entity. In response to receiving this request, at step 812 the first set of cards may be replaced by a second set of cards. Preferably, the cards in the second set are chosen randomly from those remaining in the card supply. At step 814 the cost may be debited from the client entity's account, and at step 816, the second set may be provided to the client entity.

It should be understood that a client entity may be physically or logically distinct from the gaming server. Thus, the client entity may be a client machine that is communicatively linked to the gaming server by a network. In this case, the gaming server providing information (e.g., representations of cards and/or representations of costs) to the client entity may comprise the gaming server transmitting the information through the network.

Alternatively, the client entity may be physically or logically combined with the gaming server. Thus, the client entity may be a user interface that is coupled to the gaming server, and the gaming server providing information to the client entity may comprise displaying the information on the user interface.

Figure 9:
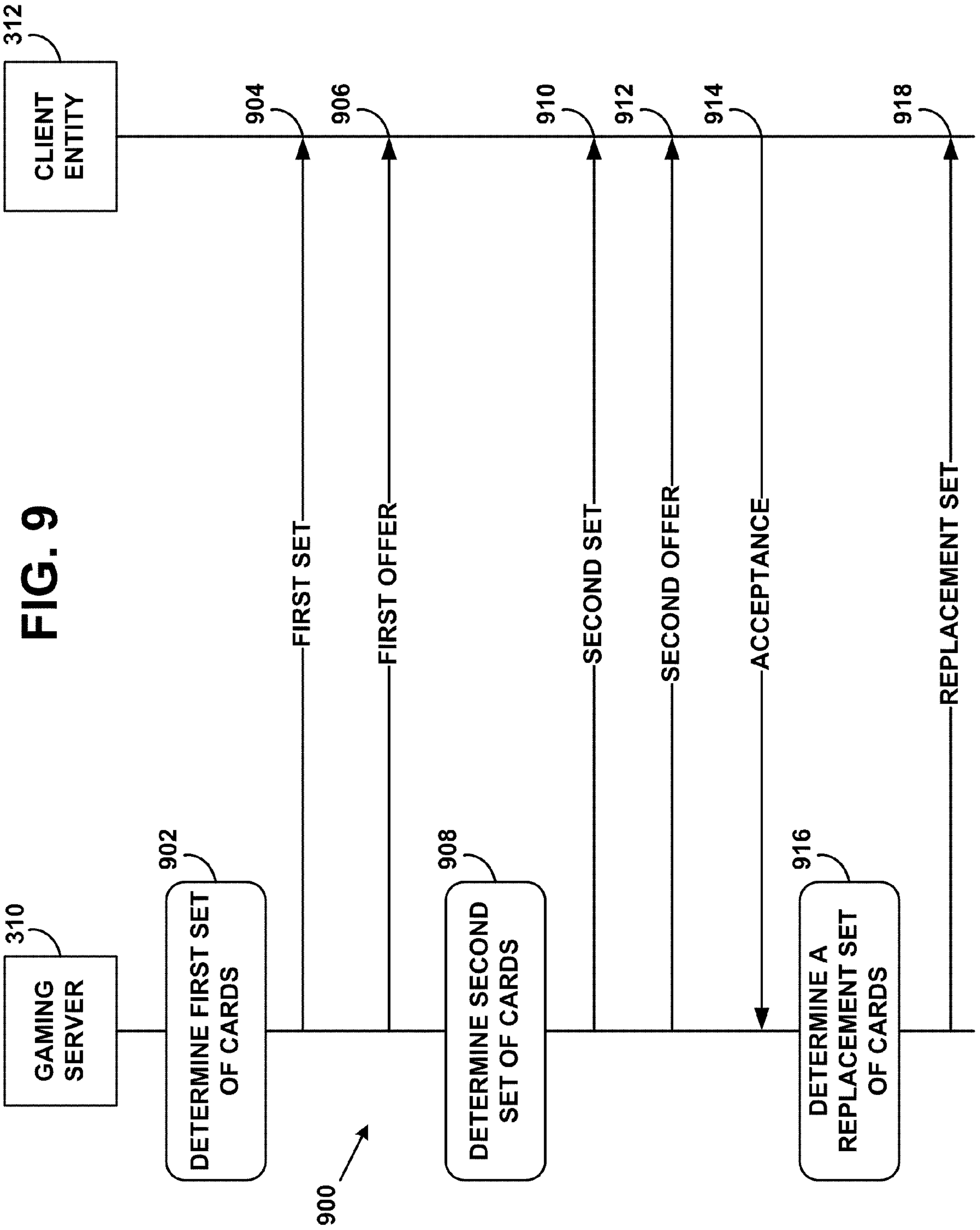
FIG. 9 is a third message flow diagram, in accordance with an example embodiment.

FIG. 9 depicts a message flow 900 for facilitating card replacement. At step 902, the gaming server 310 may determine a first set of cards, and at step 904, the gaming server 310 may transmit a representation of this first set of cards to the client entity 312. Preferably, the first set of cards is provided to the client entity 312 as part of a hand of cards to be played by the client entity 312 in a card game, such as stud poker. At step 906, the gaming server 310 may also transmit a first offer to the client entity 312. The first offer may give the client entity 312 an opportunity to replace one or more cards in the first set. It should be understood that the first offer may be transmitted with the representation of this first set of cards.

The client entity 312 may accept the first offer at any point after the client entity 312 receives the offer. Thus, the client entity 312 may accept the first offer immediately after step 906 (not shown), or at some later point in the message flow 900. Nonetheless, at step 908, the gaming server 310 may determine a second set of cards, and at step 910, the gaming server 912 may transmit a representation of this second set of cards to the client entity 312. Preferably, the second set of cards is combined with the first set of cards in the hand of cards to be played by the client entity 312. At step 912, the gaming server 310 may also provide a second offer to the client entity 312. The second offer may give the client entity 312 an opportunity to replace one or more cards in the second set. It should be understood that the second offer may be transmitted with the representation of this second set of cards.

At step 914, the client entity may transmit an acceptance to the gaming server 310. This acceptance may accept the first offer, the second offer or both. At step 916, in response to receiving the acceptance, the gaming server 310 may determine a replacement set of cards, and at step 918, the gaming server 310 may transmit a representation of the replacement set to the client entity 312. Based on the offer or offer(s) accepted, the gaming server 310 may replace the one or more cards in the first set with the one or more replacement cards, or replace the one or more cards in the second set with the one or more replacement cards. Alternatively, if the client entity 312 accepts both the first offer and the second offer, the gaming server may determine a replacement set of cards to replace both the first set and the second set.

Figure 10:
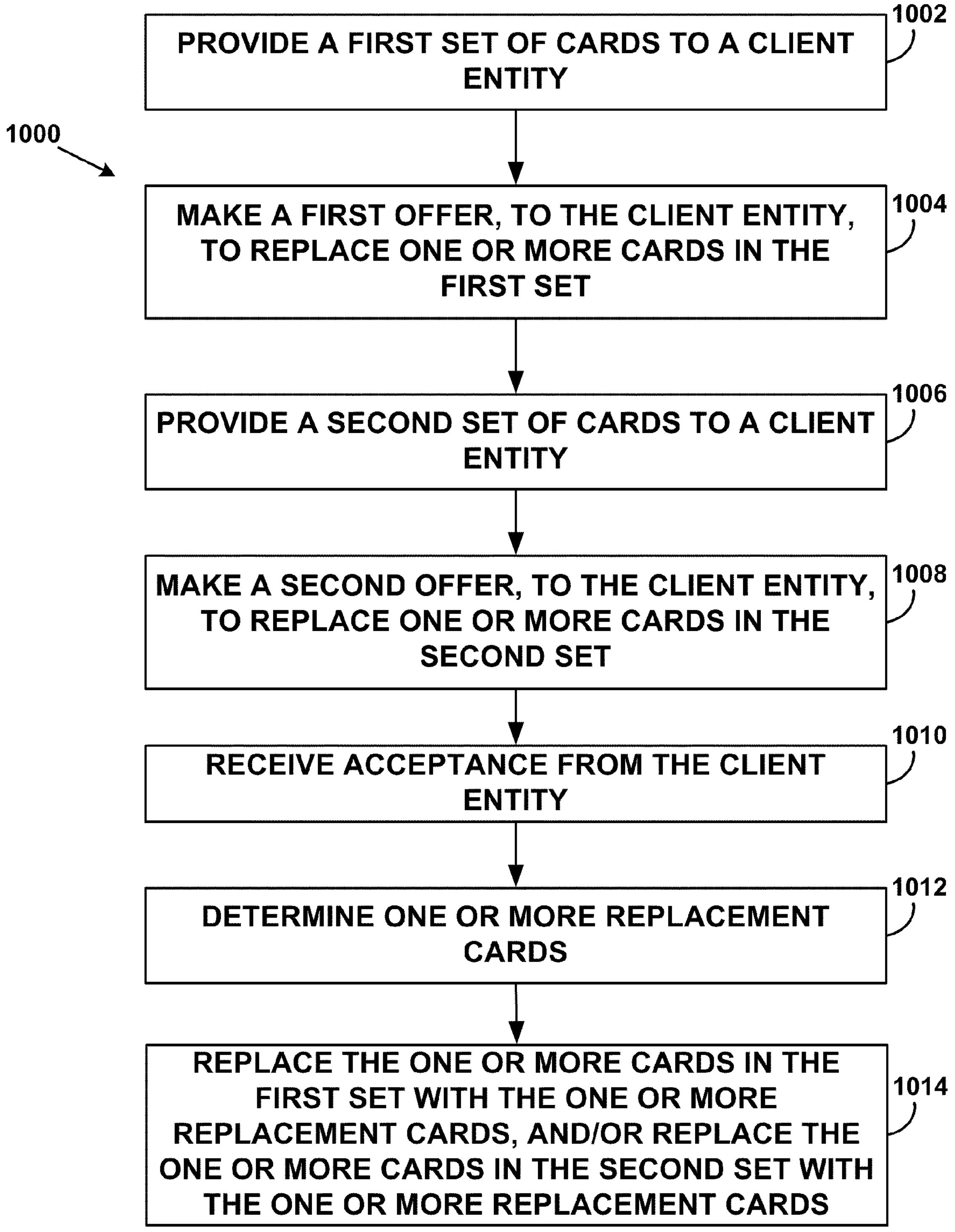
FIG. 10 is a third flow chart, in accordance with an example embodiment.

FIG. 10 is a flow chart of a method 1000 also for facilitating replacement of one or more cards in a hand of cards. Preferably, a gaming server, such as gaming server 310, performs at least some of the steps of method 1000.

At step 1002, a first set of cards may be provided to a client entity, and at step 1004, a first offer may be made to the client entity. Preferably, the first offer allows the client entity to replace one or more cards in the first set. The first offer may be provided with the first set of cards, or before or after the time that the first set of cards is provided.

At step 1006, after providing the first set of cards, a second set of cards may be provided to the client entity. The first set of cards and the second set of cards may form at least part of a hand of cards to be played by the client entity. In particular, each of the first set of cards and the second set of cards may comprise one or more cards. At step 1008, a second offer may be made to the client entity. Preferably, the second offer allows the client entity to replace one or more cards in the second set. The second offer may be provided with the second set of cards, or before or after the time that the second set of cards is provided.

At step 1010, an acceptance is received from the client entity. The client entity may accept the first offer the second offer, or both. Alternatively, acceptance of the first offer and the acceptance of the second offer may occur separately. At step 1012, in response to receiving the acceptance, one or more replacement cards may be determined. Then, at step 1014, these replacement cards may be used to replace one or more cards in the first set, or one or more cards in the second set, or both.

This method may optionally continue with steps not shown in FIG. 10. For instance, a third set of cards may be provided to the client entity, and this third set of cards may be added to the hand of cards to be played by the client entity. Then, a third offer may be made to the client entity. This third offer may allow the client entity to replace one or more cards in the third set. Thus, the client entity may accept one or more of the first offer, the second offer, and the third offer.

Additionally, the client entity may be associated with an account. Accordingly, the client entity accepting the at least one of the first offer and the second offer may include the account being debited by a cost associated with accepting one or more of these offers. Such a cost may be determined in a wide variety of ways.

Preferably, the cost is based, to some extent, on the one or more cards associated with the accepted offer. These one or more cards may include cards in the player's hand, cards in the card supply used to replace cards in the player's hand, or both. For instance, in one embodiment, the cost may be based on a relative advantage, to the client entity, of replacing the one or more cards associated with the accepted offer. In another embodiment the cost may be based on a difference between a first return associated with not replacing any cards in the first set or the second set, and an expected second return associated with replacing the one or more cards associated with the accepted offer.

Furthermore, the cost may be determined in response to the client entity accepting at least one of the first offer and the second offer. For example, the first offer may be associated with a first cost and the second offer may be associated with a second cost. The client entity accepting the first offer may result in the account being debited by the first cost, while the client entity accepting the second offer may result in the account being debited by the second cost. Moreover, there is no limit on the values that these costs may take on. Thus, the first cost might not equal the second cost, and either or both of the first cost and the second cost may be negative. Additionally, the cost may include a "rake" that is paid to the game provider.

The client entity may take on various forms. In one example, the client entity may comprise a client machine that is communicatively linked to the gaming server by a network. Therefore, in this scenario, providing the first set of cards and the second set of cards to the client entity may include transmitting representations of the first set of cards and the second set of cards to the client entity. Alternatively or additionally, the client entity may include a user interface. Thus, the method 1000 may involve displaying representations of the first set of cards and the second set of cards on the user interface.

Figure 11:
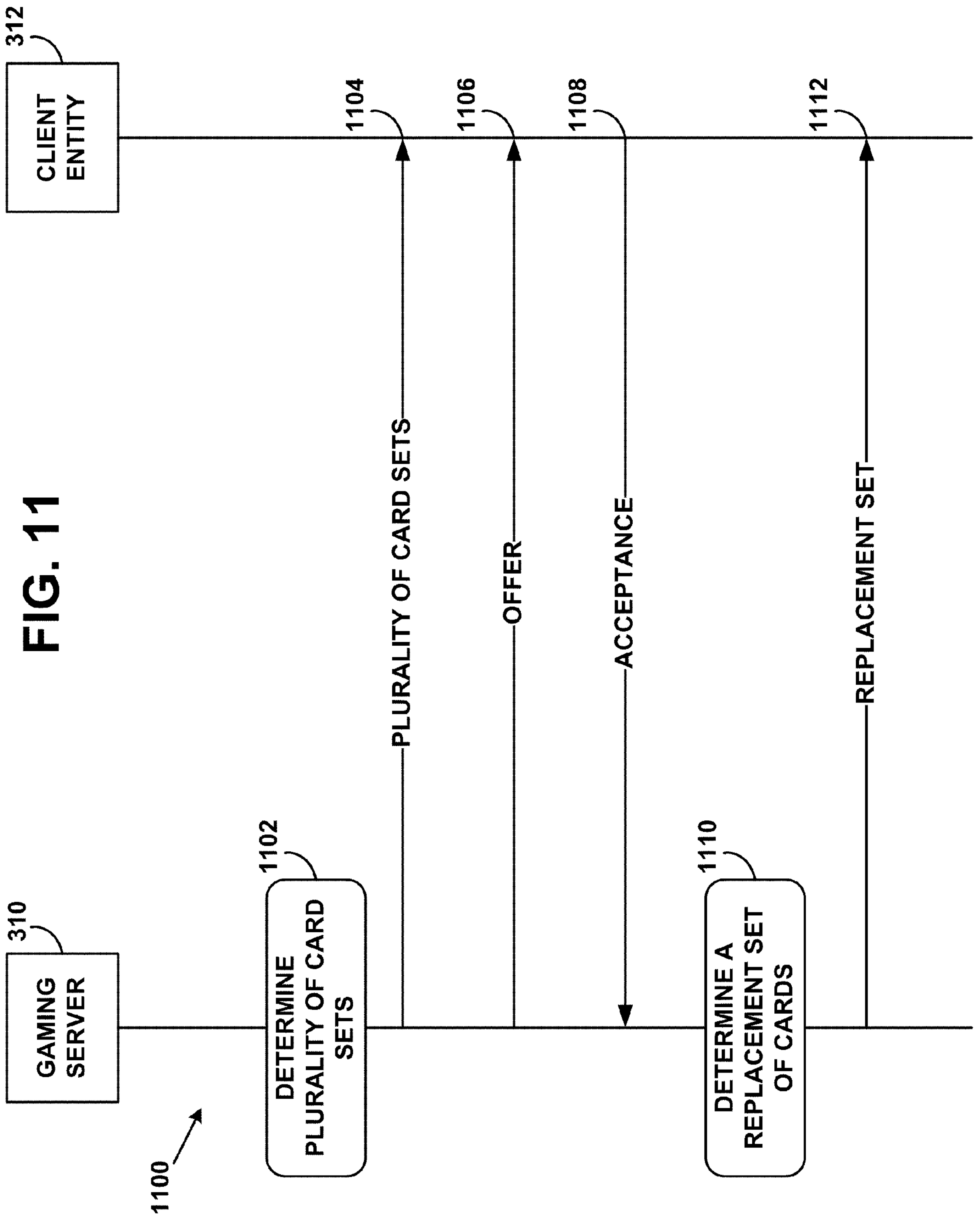
FIG. 11 is a fourth message flow diagram, in accordance with an example embodiment.

FIG. 11 depicts a message flow 1100 for facilitating card replacement. At step 1102, the gaming server 310 may determine a plurality of card sets, and at step 1104, the gaming server 310 may transmit a representation of the plurality of card sets to the client entity 312. At step 1106, the gaming server 310 may provide an offer to the client entity 312. This offer may allow the client entity 312 to replace one of the card sets in the plurality. It should be understood that the offer may be transmitted with the representation of the plurality of card sets.

At step 1108, the client entity 312 may transmit an acceptance to the gaming server 310. This acceptance may accept the offer, and may further specify which card set of the plurality that the client entity 312 seeks to replace. At step 1110, in response to receiving the acceptance, the gaming server 310 may determine a replacement set of cards. At step 1112, the gaming server 310 may transmit the replacement set to the client entity 312.

Figure 12:
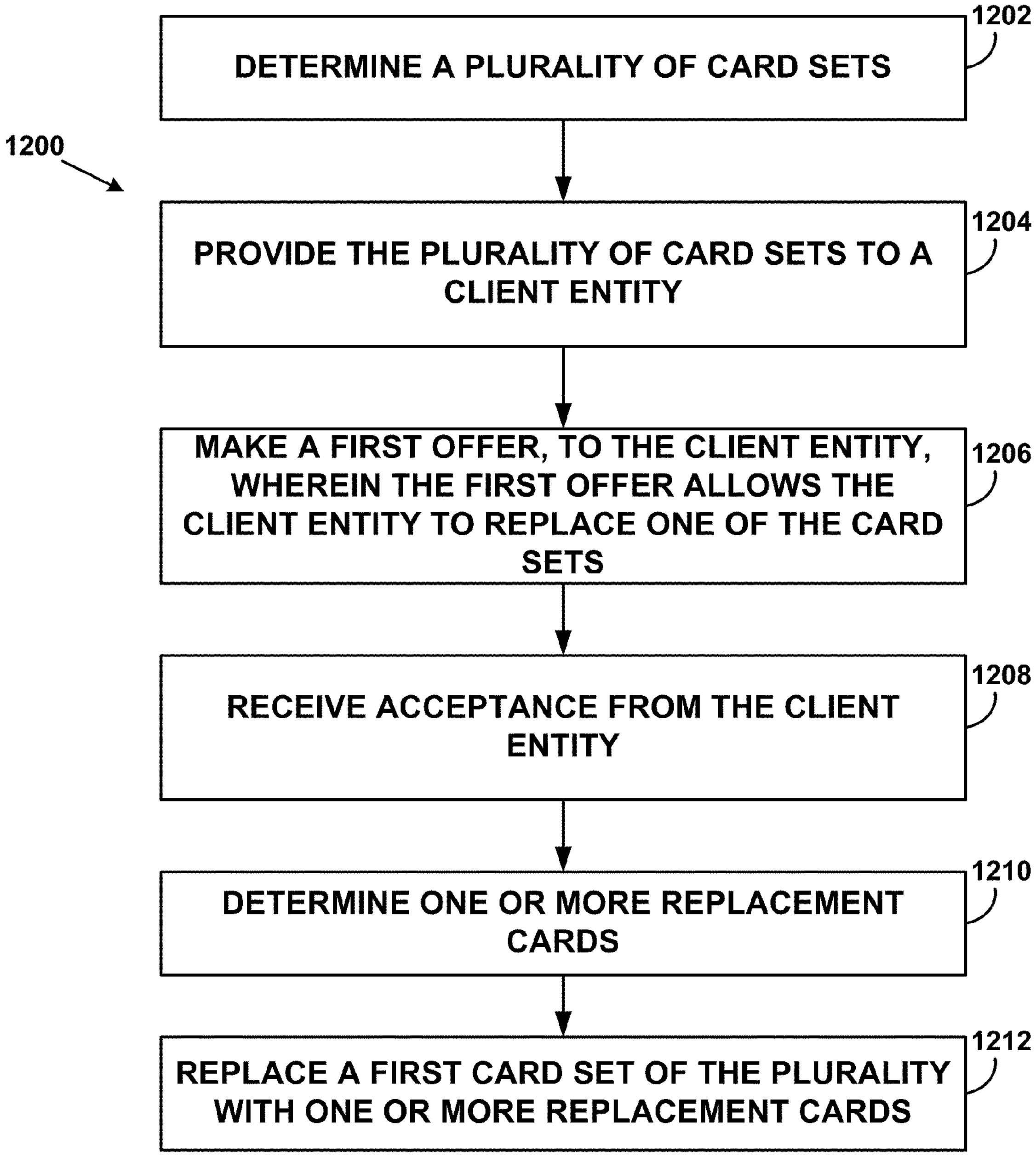
FIG. 12 is a fourth flow chart, in accordance with an example embodiment.

FIG. 12 is a flow chart of a method 1200 also for facilitating card replacement. Preferably, a gaming server, such as the gaming server 310, performs at least some of the steps of the method 1200.

At step 1202, a plurality of card sets may be determined, and at step 1204 the plurality of card sets may be provided to a client entity. Preferably, the plurality of the card sets, when combined, form at least part of a hand of cards to be played by the client entity. Furthermore, there may be at least three card sets in the plurality, and at least two of the three card sets may each contain at least two cards. However, fewer card sets and a different number of cards per set may be used.

At step 1206, a first offer may be made to the client entity. The first offer may allow the client entity to replace one of the card sets in the plurality. At step 1208, an acceptance of the first offer may be received from the client entity. This acceptance may accept the offer, and may further specify which card set of the plurality to replace. At step 1210, in response to receiving the acceptance from the client entity, one or more replacement cards may be determined, and at step 1212, a first card set of the plurality may be replaced with the replacement cards.

This method may optionally continue with steps not shown in FIG. 12. For instance, the plurality of card sets may include a final card set that is provided to the client entity after all other sets in the plurality are provided to the client entity. The first offer may allow the client to replace only the final card set.

Further, a second offer may be made to the client entity. The second offer may allow the client entity to replace another one of the card sets. Accordingly, in response to receiving an acceptance of the second offer from the client entity, a second card set of the plurality may be replaced with a second set of replacement cards.

Additionally, the client entity may be associated with an account. Accordingly, the client entity accepting the first offer and/or the second offer may include the account being debited by a cost associated with accepting these offer(s). Such a cost may be determined in a wide variety of ways.

Preferably, the cost is based, to some extent, on the one or more cards associated with the accepted offer. For instance, in one embodiment, the cost may be based on a relative advantage, to the client entity, of replacing the one or more cards associated with the accepted offer. In another embodiment the cost may be based on a difference between a first return associated with not replacing any cards in the first set or the second set, and an expected second return associated with replacing cards in the first set.

Moreover, the cost may be determined in response to the client entity accepting the first offer. For example, the first offer may be associated with the cost. Accordingly, the client entity accepting the first offer may result in the account being debited by the cost. Furthermore, there is no limit on the value that the cost may take on. Thus, the cost may be negative. Additionally, the cost may include a "rake" that is paid to the game provider.

The client entity may take on various forms. In one example, the client entity may comprise a client machine that is communicatively linked to the gaming server by a network. Therefore, in this scenario, providing the plurality of card sets to the client entity may include transmitting representations of the card sets in the plurality to the client entity. Alternatively or additionally, the client entity may include a user interface. In this case, providing the plurality of card sets to the client entity may involve displaying representations of the card sets in the plurality on the user interface.

V. Conclusion

For the embodiments described herein, the terms "random" or "randomly" shall refer to any realizable process of randomly generating events. Such processes shall include, but not be limited to, generating events without a deterministic pattern of occurrences. Additionally, these processes may be pseudo-random, thus resulting in a deterministic pattern of occurrences that exhibit some form of statistical randomness.

It should also be understood that use of any form of enumeration within an element of any of the claims should not be construed to imply that an ordering of events within the claim is required.

Furthermore, other variations from the disclosed embodiments may be made without departure from the scope of the invention. All questions concerning scope are to be answered by reference to the appended claims.

What is claimed is:

1. A method comprising:

a gaming server providing a first set of cards to a client entity, wherein the client entity is associated with an account;

the gaming server making a first offer to the client entity, wherein the first offer allows the client entity to replace one or more cards in the first set and is associated with a first cost;

after providing the first set of cards and making the first offer, the gaming server providing a second set of cards to the client entity, wherein the first set of cards and the second set of cards, when combined, form a hand of cards to be played by the client entity;

the gaming server making a second offer to the client entity, wherein the second offer allows the client entity to replace one or more cards in the second set and is associated with a second cost; and the gaming server receiving acceptance, from the client entity, of at least one of the first offer and the second offer and debiting the account by an associated cost, such that:

should the client entity accept the first offer, the associated cost includes the first cost, wherein the first cost is determined by the gaming server, and should the client entity accept the second offer, the associated cost includes the second cost, wherein the second cost is determined by the gaming server.

2. The method of claim 1, further comprising:

in response to the gaming server receiving acceptance of the at least one of the first offer and the second offer:

the gaming server determining one or more replacement cards; and the gaming server replacing the one or more cards in the first set with the one or more replacement cards, or replacing the one or more cards in the second set with the one or more replacement cards.

3. The method of claim 1, wherein at least one wagering round takes place between when the gaming server provides the first set of cards and when the gaming server provides the second set of cards.

4. The method of claim 1, wherein the associated cost is based on a relative advantage, to the client entity, of replacing cards associated with the accepted offer(s).

5. The method of claim 1, wherein the associated cost is based on a difference between a first return associated with not replacing any cards in the first set or the second set, and an expected second return associated with replacing cards associated with the accepted offer(s).

6. The method of claim 1, wherein the associated cost is based on cards associated with the accepted offer(s).

7. The method of claim 1, wherein the first cost is not equal to the second cost.

8. The method of claim 1, wherein at least one of the first cost and the second cost are negative.

9. The method of claim 1, further comprising:

the gaming server providing a third set of cards to the client entity, wherein the third set of cards is added to the hand of cards to be played by the client entity; and the gaming server making a third offer to the client entity, wherein the third offer allows the client entity to replace one or more cards in the third set, and wherein the client entity accepts one of the first offer, the second offer, and the third offer.

10. The method of claim 1, wherein the client entity comprises a client machine that is communicatively linked to the gaming server by a network, and wherein providing the first set of cards and the second set of cards to the client entity comprises the gaming server transmitting representations of the first set of cards and the second set of cards to the client entity.

11. The method of claim 1, wherein the client entity comprises a user interface, and wherein providing the first set of cards and the second set of cards to the client entity comprises the gaming server displaying representations of the first set of cards and the second set of cards on the user interface.

12. A method comprising:

a gaming server providing a plurality of card sets to a client entity, wherein the plurality of the card sets, when combined, form a single hand of cards to be played by the client entity, and wherein the client entity is associated with an account;

the gaming server making a first offer to the client entity, wherein the first offer allows the client entity to replace one of the card sets and is associated with a first cost;

the gaming server determining the first cost;

the gaming server transmitting a representation of the first cost to the client entity;

the gaming server receiving an acceptance of the first offer from the client entity; and in response to receiving the acceptance of the first offer from the client entity, the gaming server replacing a first card set of the plurality with a first set of replacement cards and debiting the account by the first cost.

13. The method of claim 12, wherein the plurality of card sets includes a final card set that the gaming server provides to the client entity after the gaming server provides all other sets in the hand to the client entity, and wherein the first offer allows the client to replace only the final card set.

14. The method of claim 12, further comprising:

the gaming server making a second offer to the client entity, wherein the second offer allows the client entity to replace another one of the card sets; and in response to receiving an acceptance of the second offer from the client entity, the gaming server replacing a second card set of the plurality with a second set of replacement cards.

15. The method of claim 12, wherein the first cost is based on a relative advantage, to the client entity, of replacing the first set.

16. The method of claim 12, wherein the first cost is based on a difference between a first return associated with not replacing the first set, and an expected second return associated with replacing the first set.

17. The method of claim 12, wherein the first cost is based on the cards in the first card set.

18. The method of claim 12, wherein the first cost is negative.

19. The method of claim 12, wherein the client entity comprises a client machine that is communicatively linked to the gaming server by a network, and wherein providing the plurality of card sets to the client entity comprises the gaming server transmitting representations of the plurality of card sets to the client entity.

20. The method of claim 12, wherein the client entity comprises a user interface, and wherein providing the plurality of card sets to the client entity comprises the gaming server displaying representations of the plurality of card sets on the user interface.

21. The method of claim 12, wherein there are at least three card sets in the plurality, and wherein at least two of the three card sets each contain at least two cards.

22. The method of claim 12, wherein after the gaming server provides each card set in the plurality to the client entity, a respective wagering round takes place.

23. A gaming server comprising:

a processor;

a data storage; and program instructions, stored in the data storage and executable by the processor, to:

provide a first set of cards to a client entity, wherein the client entity is associated with an account;

make a first offer to the client entity, wherein the first offer allows the client entity to replace one or more cards in the first set and is associated with a first cost;

after providing the first set of cards and making the first offer, provide a second set of cards to the client entity, wherein the first set of cards and the second set of cards, when combined, form a hand of cards to be played by the client entity;

make a second offer to the client entity, wherein the second offer allows the client entity to replace one or more cards in the second set and is associated with a second cost; and receive acceptance, from the client entity, of at least one of the first offer and the second offer and debiting the account by an associated cost, such that:

should the client entity accept the first offer, the associated cost includes the first cost, wherein the first cost is determined by the gaming server, and should the client entity accept the second offer, the associated cost includes the second cost, wherein the second cost is determined by the gaming server.

24. The gaming server of claim 23, further comprising:

program instructions, stored in the data storage and executable by the processor, to:

in response to receiving acceptance of the at least one of the first offer and the second offer:

determine one or more replacement cards, and replace the one or more cards in the first set with the one or more replacement cards, or replace the one or more cards in the second set with the one or more replacement cards.

25. The gaming server of claim 23, wherein at least one wagering round takes place between when the gaming server provides the first set of cards and when the gaming server provides the second set of cards.

26. The gaming server of claim 23, wherein the associated cost is based on a relative advantage, to the client entity, of replacing cards associated with the accepted offer(s).

27. The gaming server of claim 23, wherein the associated cost is based on a difference between a first return associated with not replacing any cards in the first set or the second set, and an expected second return associated with replacing cards associated with the accepted offer(s).

28. The gaming server of claim 23, wherein the associated cost is based on cards associated with the accepted offer(s).

29. The gaming server of claim 23, wherein the first cost is not equal to the second cost.

30. The gaming server of claim 23, wherein at least one of the first cost and the second cost are negative.

31. The gaming server of claim 23, further comprising:

program instructions, stored in the data storage and executable by the processor, to:

provide a third set of cards to the client entity, wherein the third set of cards is added to the hand of cards to be played by the client entity, and make a third offer to the client entity, wherein the third offer allows the client entity to replace one or more cards in the third set, and wherein the client entity accepts one of the first offer, the second offer, and the third offer.

32. The gaming server of claim 23, further comprising:

a network interface capable of communicating on a network, wherein the client entity comprises a client machine that is communicatively linked to the gaming server by the network, and wherein providing the first set of cards and the second set of cards to the client entity comprises the gaming server transmitting representations of the first set of cards and the second set of cards to the client entity via the network.

33. The gaming server of claim 23, further comprising:

a user interface, wherein the client entity comprises the user interface, and wherein providing the first set of cards and the second set of cards to the client entity comprises the gaming server displaying representations of the first set of cards and the second set of cards on the user interface.

34. A gaming server comprising:

a processor;

a data storage; and program instructions, stored in the data storage and executable by the processor, to:

provide a plurality of card sets to a client entity, wherein the plurality of the card sets, when combined, form a single hand of cards to be played by the client entity, and wherein the client entity is associated with an account;

make a first offer to the client entity, wherein the first offer allows the client entity to replace one of the card sets and is associated with a first cost;

determine the first cost;

transmit a representation of the first cost to the client entity;

receive an acceptance of the first offer from the client entity; and in response to receiving the acceptance of the first offer from the client entity, the gaming server replacing a first card set of the plurality with a first set of replacement cards and debiting the account by the first cost.

35. The gaming server of claim 34, wherein the plurality of card sets includes a final card set that the gaming server provides to the client entity after the gaming server provides all other sets in the hand to the client entity, and wherein the first offer allows the client to replace only the final card set.

36. The gaming server of claim 34, further comprising:

program instructions, stored in the data storage and executable by the processor, to:

make a second offer to the client entity, wherein the second offer allows the client entity to replace another one of the card sets, and in response to receiving an acceptance of the second offer from the client entity, replace a second card set of the plurality with a second set of replacement cards.

37. The gaming server of claim 34, wherein the first cost is based on a relative advantage, to the client entity, of replacing the first set.

38. The gaming server of claim 34, wherein the first cost is based on a difference between a first return associated with not replacing the first set, and an expected second return associated with replacing the first set.

39. The gaming server of claim 34, wherein the first cost is based on the cards in the first card set.

40. The gaming server of claim 34, wherein the first cost is negative.

41. The gaming server of claim 34, further comprising:

a network interface capable of communicating on a network, wherein the client entity comprises a client machine that is communicatively linked to the gaming server by the network, wherein providing the plurality of card sets to the client entity comprises the gaming server transmitting representations of the plurality of card sets to the client machine via the network.

42. The gaming server of claim 34, further comprising:

a user interface, wherein the client entity comprises the user interface, and wherein providing the plurality of card sets to the client entity comprises the gaming server displaying representations of the plurality of card sets on the user interface.

43. The gaming server of claim 34, wherein there are at least three card sets in the plurality, and wherein at least two of the three card sets each contain at least two cards.

44. The gaming server of claim 34, wherein after the gaming server provides each card set in the plurality to the client entity, a respective wagering round takes place.

45. An article of manufacture, including a non-transitory computer-readable medium, having instructions stored thereon that, if executed by a computing device, cause the device to perform operations comprising:

providing a first set of cards to a client entity, wherein the client entity is associated with an account;

making a first offer to the client entity, wherein the first offer allows the client entity to replace one or more cards in the first set and is associated with a first cost;

after providing the first set of cards and making the first offer, providing a second set of cards to the client entity, wherein the first set of cards and the second set of cards, when combined, form a hand of cards to be played by the client entity;

making a second offer to the client entity, wherein the second offer allows the client entity to replace one or more cards in the second set and is associated with a second cost; and the gaming server receiving acceptance, from the client entity, of at least one of the first offer and the second offer and debiting the account by an associated cost, such that:

should the client entity accept the first offer, the associated cost includes the first cost, wherein the first cost is determined by the gaming server, and should the client entity accept the second offer, the associated cost includes the second cost, wherein the second cost is determined by the gaming server.

46. An article of manufacture, including a non-transitory computer-readable medium, having instructions stored thereon that, if executed by a computing device, cause the device to perform operations comprising:

providing a plurality of card sets to a client entity, wherein the plurality of the card sets, when combined, form a single hand of cards to be played by the client entity, and wherein the client entity is associated with an account;

making a first offer to the client entity, wherein the first offer allows the client entity to replace one of the card sets and is associated with a first cost;

determining the first cost;

transmitting a representation of the first cost to the client entity;

receiving an acceptance of the first offer from the client entity; and in response to receiving the acceptance of the first offer from the client entity, replacing a first card set of the plurality with a first set of replacement cards and debiting the account by the first cost.

* * * * *